US011213910B2

(12) United States Patent
Nadler et al.

(10) Patent No.: US 11,213,910 B2
(45) Date of Patent: Jan. 4, 2022

(54) TORCH INDICATOR APPARATUS AND METHODS

(71) Applicant: The ESAB Group Inc., Florence, SC (US)

(72) Inventors: Michael Nadler, Wilmot, NH (US); Ryan Lynaugh, Cornish, NH (US)

(73) Assignee: THE ESAB GROUP INC., Annapolis Junction, MD (US)

( * ) Notice: Subject to any disclaimer, the term of this patent is extended or adjusted under 35 U.S.C. 154(b) by 189 days.

(21) Appl. No.: 16/575,596

(22) Filed: Sep. 19, 2019

(65) Prior Publication Data

US 2021/0086285 A1     Mar. 25, 2021

(51) Int. Cl.
*B23K 10/00*     (2006.01)

(52) U.S. Cl.
CPC .................................. *B23K 10/006* (2013.01)

(58) Field of Classification Search
CPC ... H05H 1/26; H05H 1/36; H05H 1/28; B23K 10/006
USPC ............ 219/121.48, 121.39, 121.45, 121.54, 219/121.59
See application file for complete search history.

(56) References Cited

U.S. PATENT DOCUMENTS

| | | | |
|---|---|---|---|
| 4,861,963 | A | 8/1989 | Wallner |
| 6,315,186 | B1 | 11/2001 | Friedl et al. |
| 6,992,262 | B2 | 1/2006 | Matus et al. |
| 7,034,244 | B2 | 4/2006 | Matus |
| 7,084,367 | B2 | 8/2006 | Sommerfeld et al. |
| 7,291,808 | B2 | 11/2007 | Burgstaller et al. |

(Continued)

FOREIGN PATENT DOCUMENTS

| | | |
|---|---|---|
| WO | 2012052231 A1 | 4/2012 |
| WO | 2014092903 A1 | 6/2014 |
| WO | 2018070117 A1 | 4/2018 |

OTHER PUBLICATIONS

Notification of Transmittal of International Search Report and Written Opinion including International Search Report and Written Opinion for International Application No. PCT/US2020/050810 dated Feb. 11, 2021, 14 pages.

(Continued)

*Primary Examiner* — Justin C Dodson
(74) *Attorney, Agent, or Firm* — Edell, Shapiro & Finnan, LLC

(57) ABSTRACT

According to one embodiment, a welding or plasma cutting system is provided that includes a torch having a torch body. Located on or in the torch body are one or more status indicators that provide, for example, a status of a process parameter (e.g. current data, pressure data, etc.) and/or of an operating mode of the torches. Control circuitry coupled to the one or more status indicators is configured to activate the one or more status indicators prior to a carrying out of a welding or plasma cutting operation through use of the torch and to deactivate the one or more status indicators during a time when the welding or plasma cutting operation is being carried out by the torch. An associated method of operating the torch includes activating the one or more status indicators prior to a carrying out of a welding or plasma cutting operation by use of the torch, and during a time when the welding or plasma cutting operation is being carried out by use of the torch, deactivating the one or more status indicators.

20 Claims, 23 Drawing Sheets

(56) References Cited

U.S. PATENT DOCUMENTS

| | | |
|---|---|---|
| 7,615,719 B2 | 11/2009 | Sanders |
| 7,615,720 B2 | 11/2009 | Sanders |
| 8,203,096 B2 | 6/2012 | Sanders et al. |
| 8,258,424 B2 | 9/2012 | Griffin |
| 8,307,717 B2 | 11/2012 | Buchman |
| 8,350,182 B2 | 1/2013 | Shipulski et al. |
| 8,431,862 B2 | 4/2013 | Kachline |
| 8,633,415 B2 | 1/2014 | Griffin |
| 8,763,473 B2 | 7/2014 | Buchman |
| 8,890,021 B2 | 11/2014 | Shipulski et al. |
| 9,067,271 B2 | 6/2015 | Kadlec et al. |
| 9,073,139 B2 | 7/2015 | Christopher et al. |
| 9,180,546 B2 | 11/2015 | Jarvis |
| 9,266,182 B2 | 2/2016 | Hung et al. |
| 9,368,045 B2 | 6/2016 | Becker |
| 9,415,459 B2 | 8/2016 | Bornemann et al. |
| 9,583,014 B2 | 2/2017 | Becker |
| 9,583,023 B2 | 2/2017 | Becker et al. |
| 9,589,481 B2 | 3/2017 | Becker et al. |
| 9,636,768 B2 | 5/2017 | Rozmarynowski |
| 9,724,787 B2 | 8/2017 | Becker et al. |
| 9,737,953 B2 | 8/2017 | Chantry |
| 10,056,010 B2 | 8/2018 | Salsich et al. |
| 10,105,782 B2 | 10/2018 | Becker et al. |
| 10,144,080 B2 | 12/2018 | Chantry et al. |
| 10,170,019 B2 | 1/2019 | Becker et al. |
| 10,201,869 B2 | 2/2019 | Enyedy et al. |
| 10,210,773 B2 | 2/2019 | Becker et al. |
| 10,245,672 B2 | 4/2019 | Kachline |
| 2006/0049152 A1 | 3/2006 | Matus |
| 2011/0220616 A1 | 9/2011 | Mehn et al. |
| 2011/0220619 A1 | 9/2011 | Mehn et al. |
| 2013/0112660 A1 | 5/2013 | Enyedy et al. |
| 2013/0200056 A1 | 8/2013 | Kachline |
| 2013/0200058 A1 | 8/2013 | Kachline |
| 2013/0288211 A1 | 10/2013 | Patterson et al. |
| 2014/0166629 A1* | 6/2014 | Kadlec .............. B23K 9/287 219/121.39 |
| 2014/0166631 A1* | 6/2014 | Rozmarynowski .... B23K 10/00 219/121.48 |
| 2015/0379894 A1 | 12/2015 | Becker et al. |
| 2016/0125764 A1 | 5/2016 | Becker |
| 2016/0136764 A1 | 5/2016 | Enyedy et al. |
| 2016/0144445 A1 | 5/2016 | Hung et al. |
| 2016/0346862 A1 | 12/2016 | Bornemann et al. |
| 2017/0036290 A1 | 2/2017 | Enyedy et al. |
| 2017/0148352 A1 | 5/2017 | Becker |
| 2017/0165776 A1 | 6/2017 | Becker et al. |
| 2017/0169729 A1 | 6/2017 | Becker et al. |
| 2017/0312845 A1 | 11/2017 | Chantry |
| 2018/0161910 A1 | 6/2018 | Enyedy et al. |
| 2018/0185947 A1 | 7/2018 | Knoener et al. |
| 2018/0301059 A1 | 10/2018 | Becker et al. |
| 2019/0005846 A1 | 1/2019 | Salsich et al. |
| 2019/0035306 A1 | 1/2019 | Becker et al. |
| 2019/0076950 A1 | 3/2019 | Becker et al. |
| 2019/0151975 A1 | 5/2019 | Campbell |

OTHER PUBLICATIONS weldingoutfitter.com, Tweco PulseMaster 350 Amp MIG GUN—Tweco Style with Smart Display, accessed on May 9, 2019, accessible at https://www.weldingoutfitter.com/products/tweco-pulsemaster-350-amp-mig-gun-tweco-style-with-smart-digital-display?variant=12091360280652.

* cited by examiner

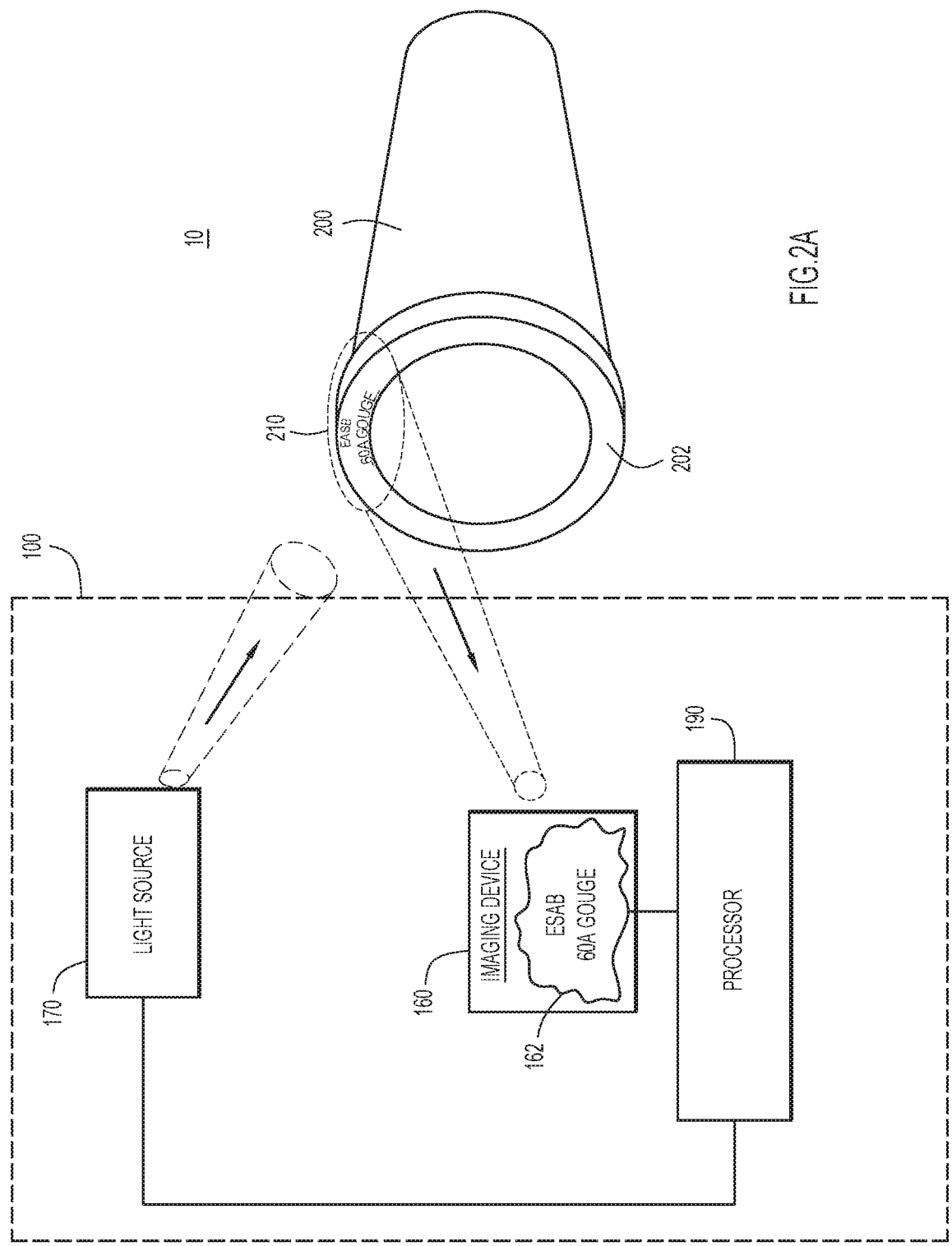

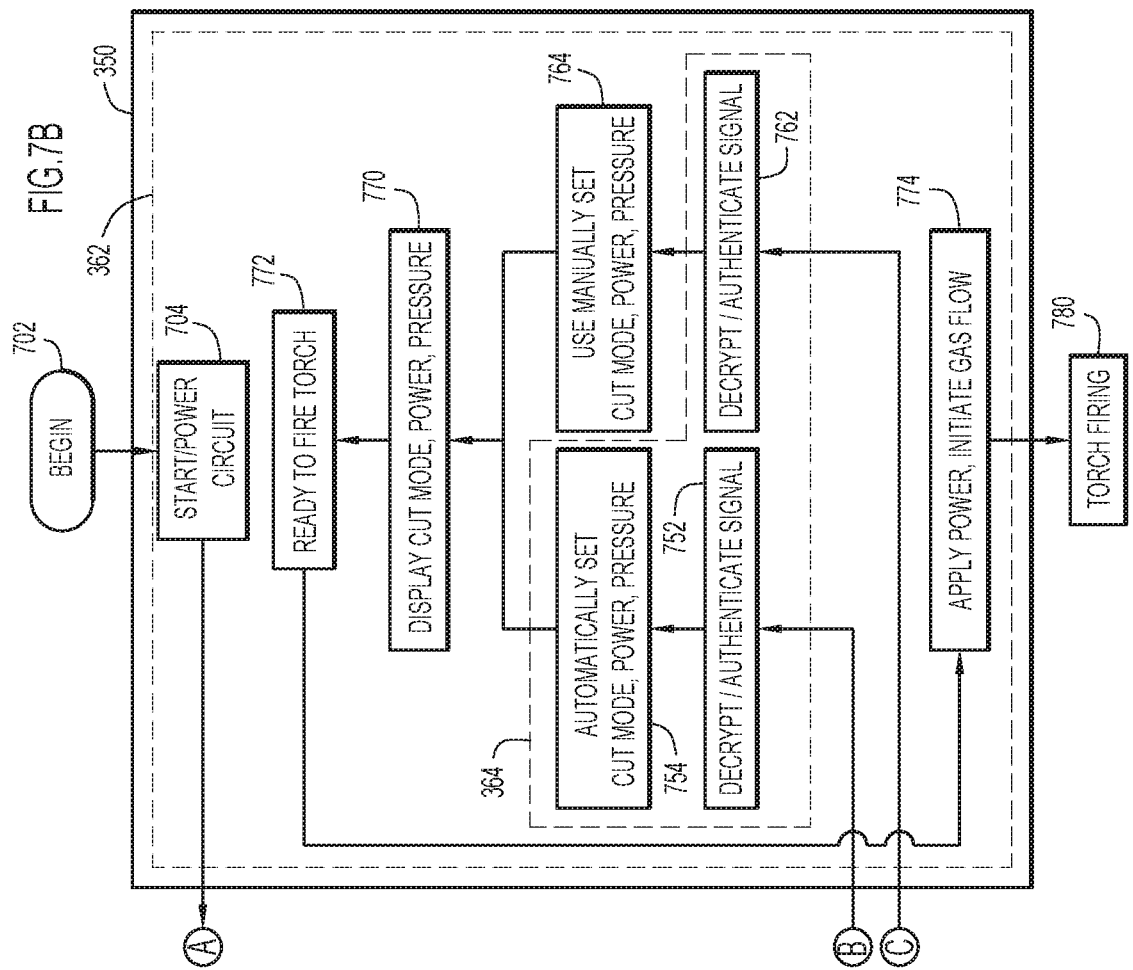

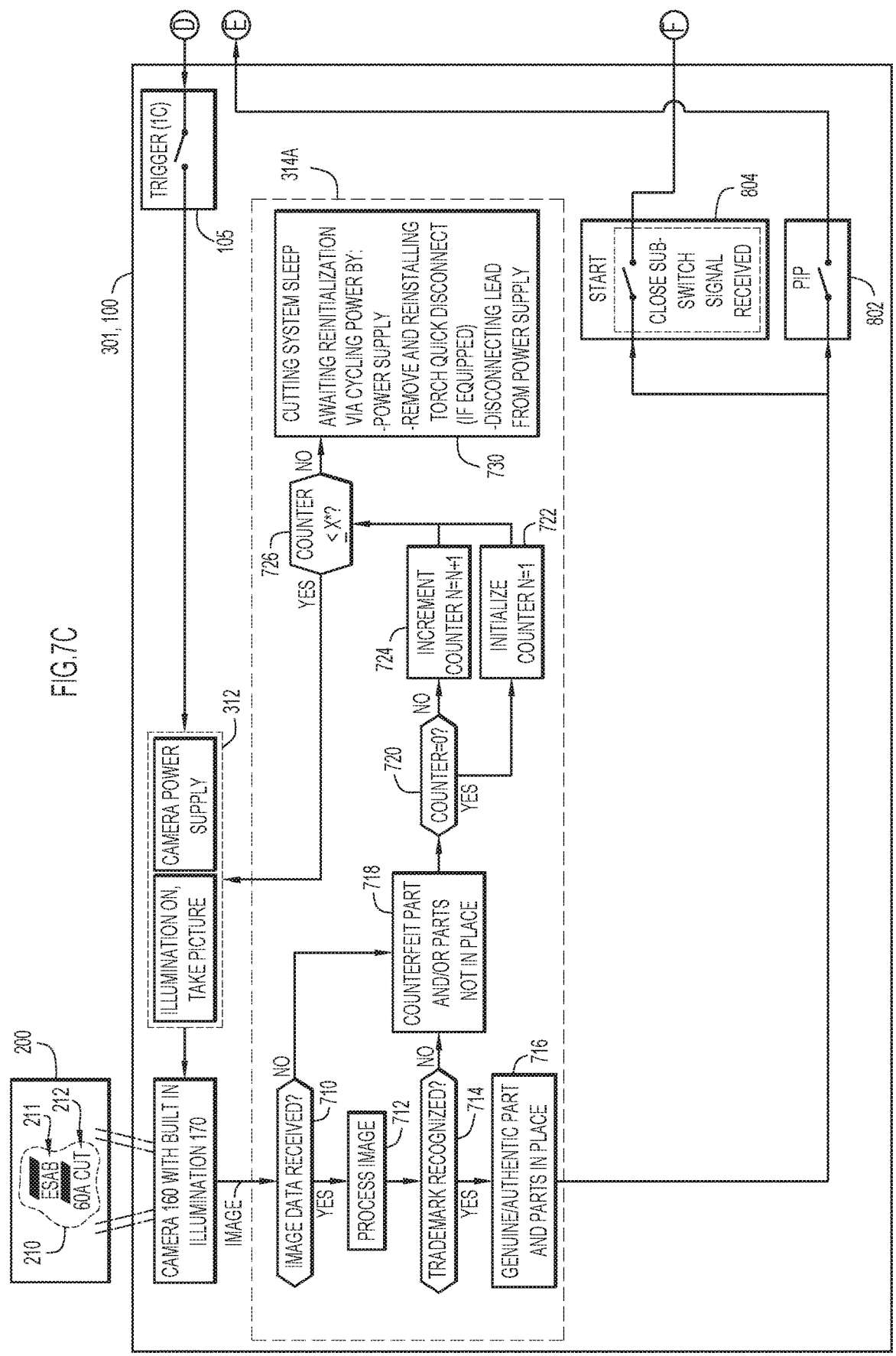

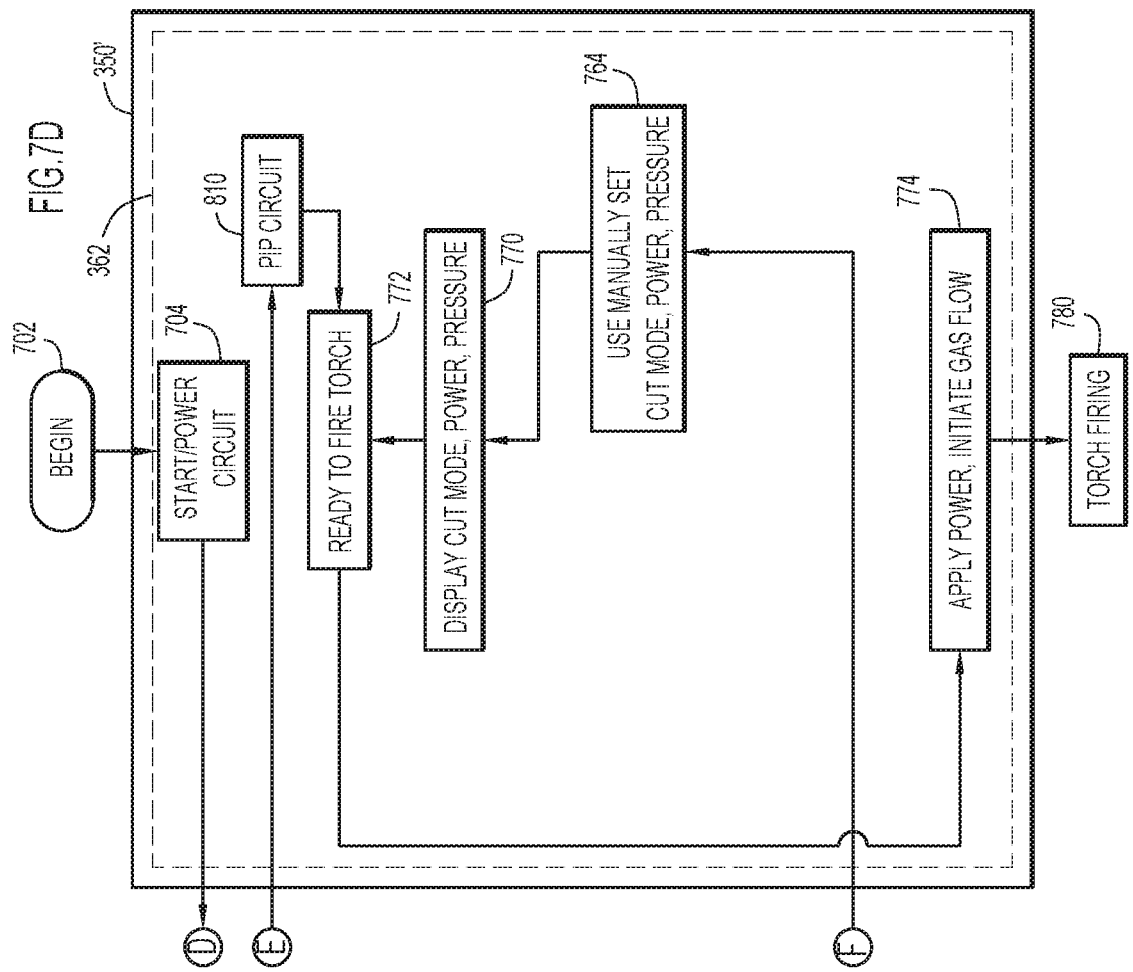

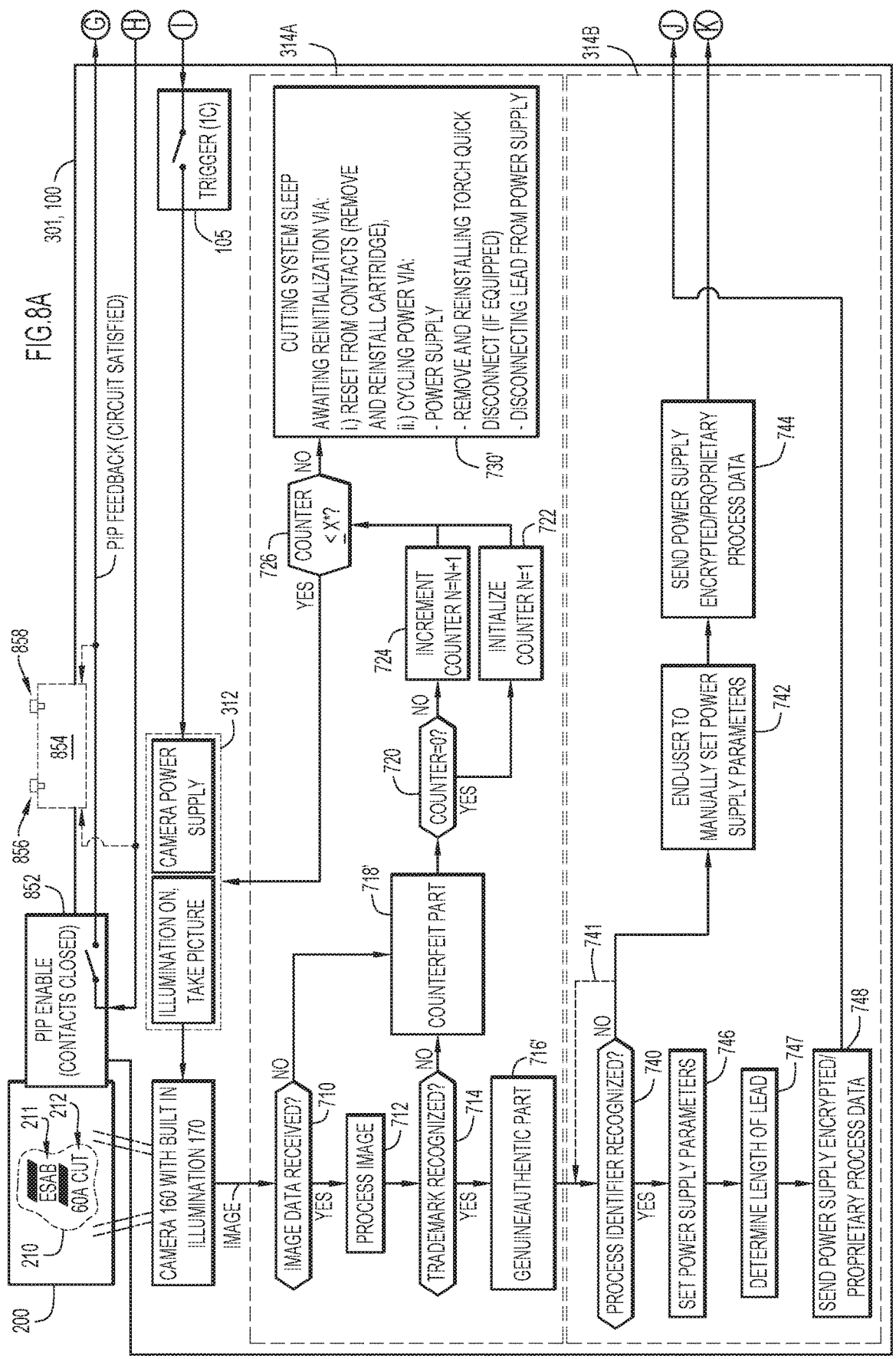

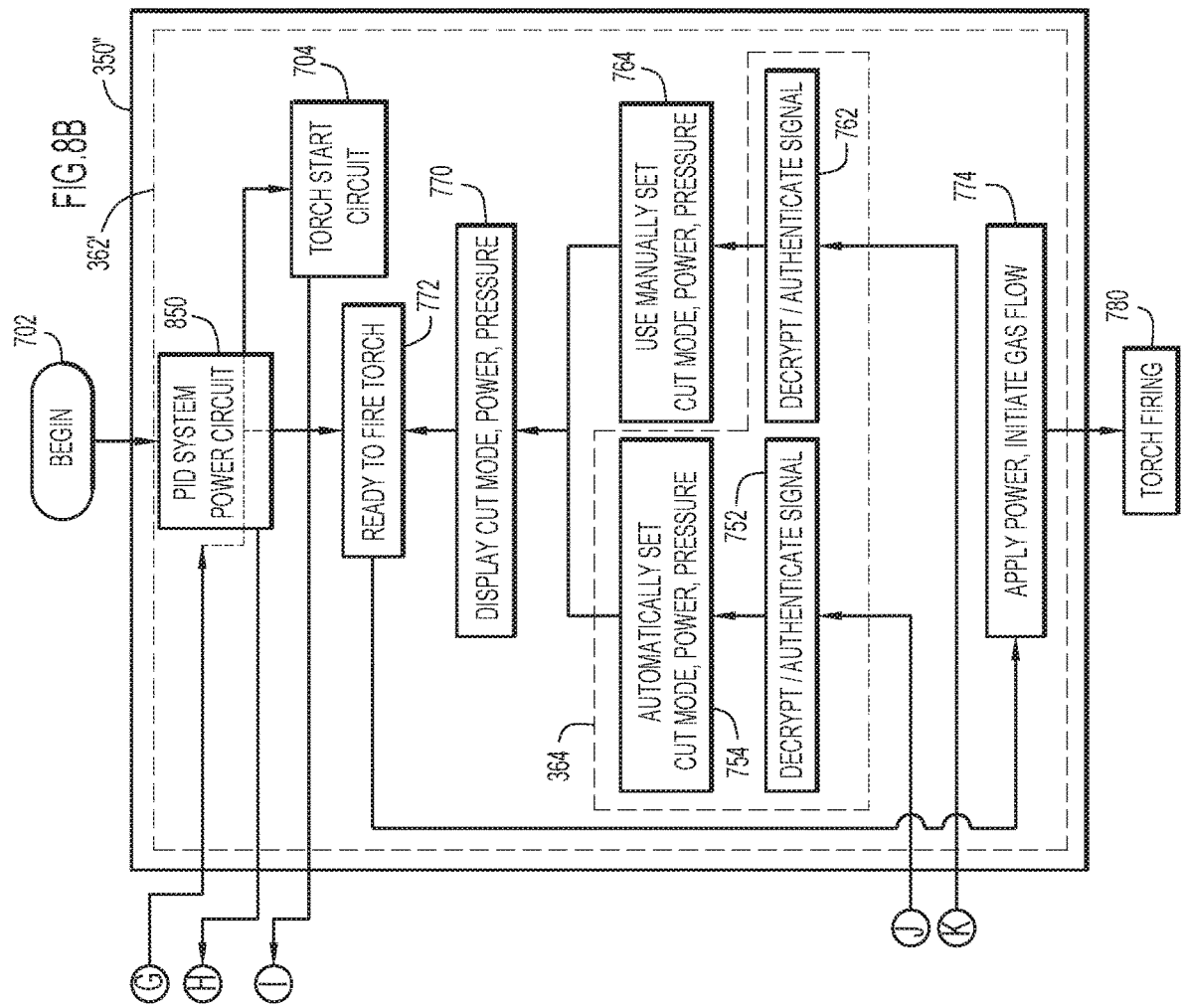

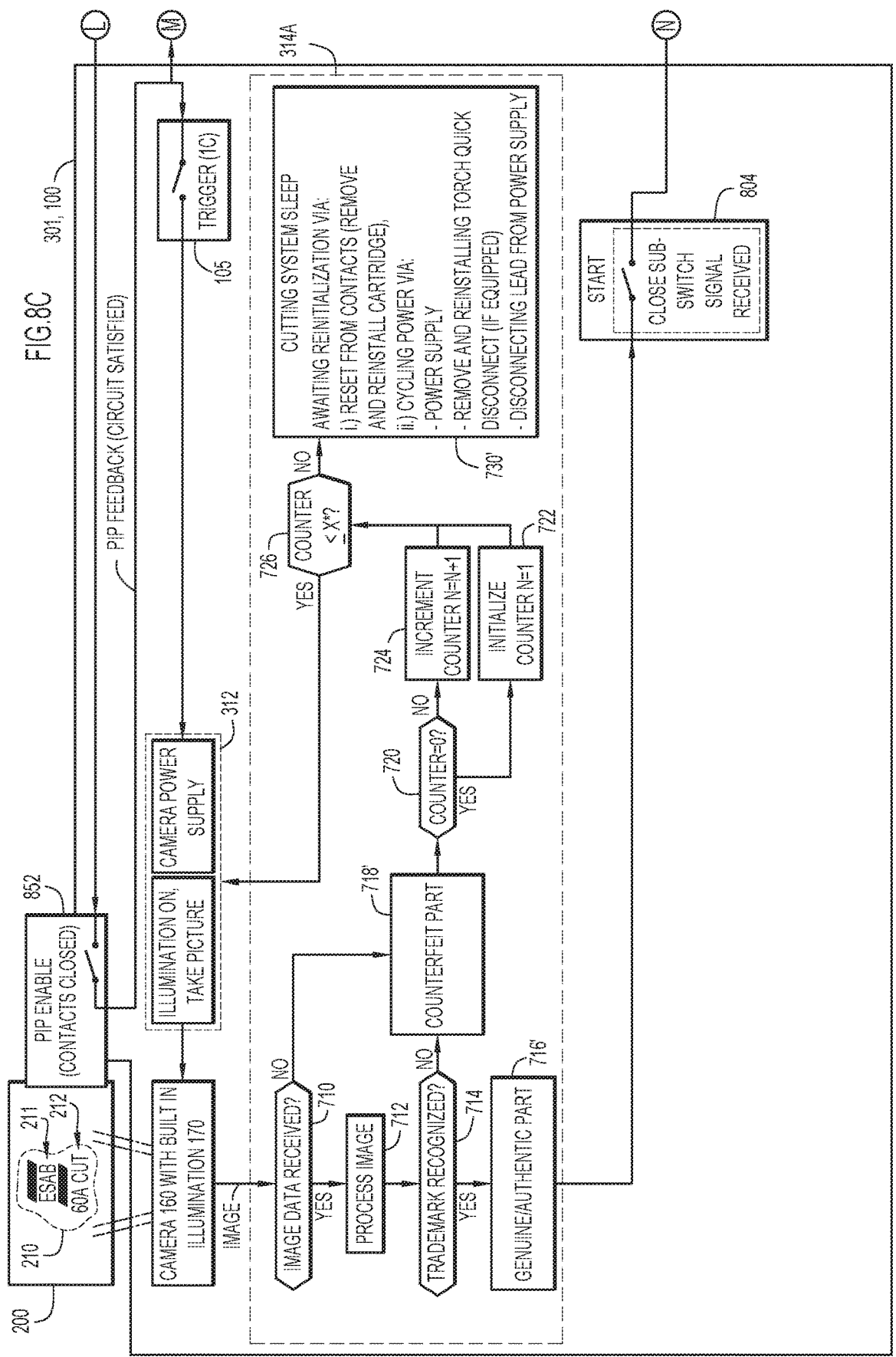

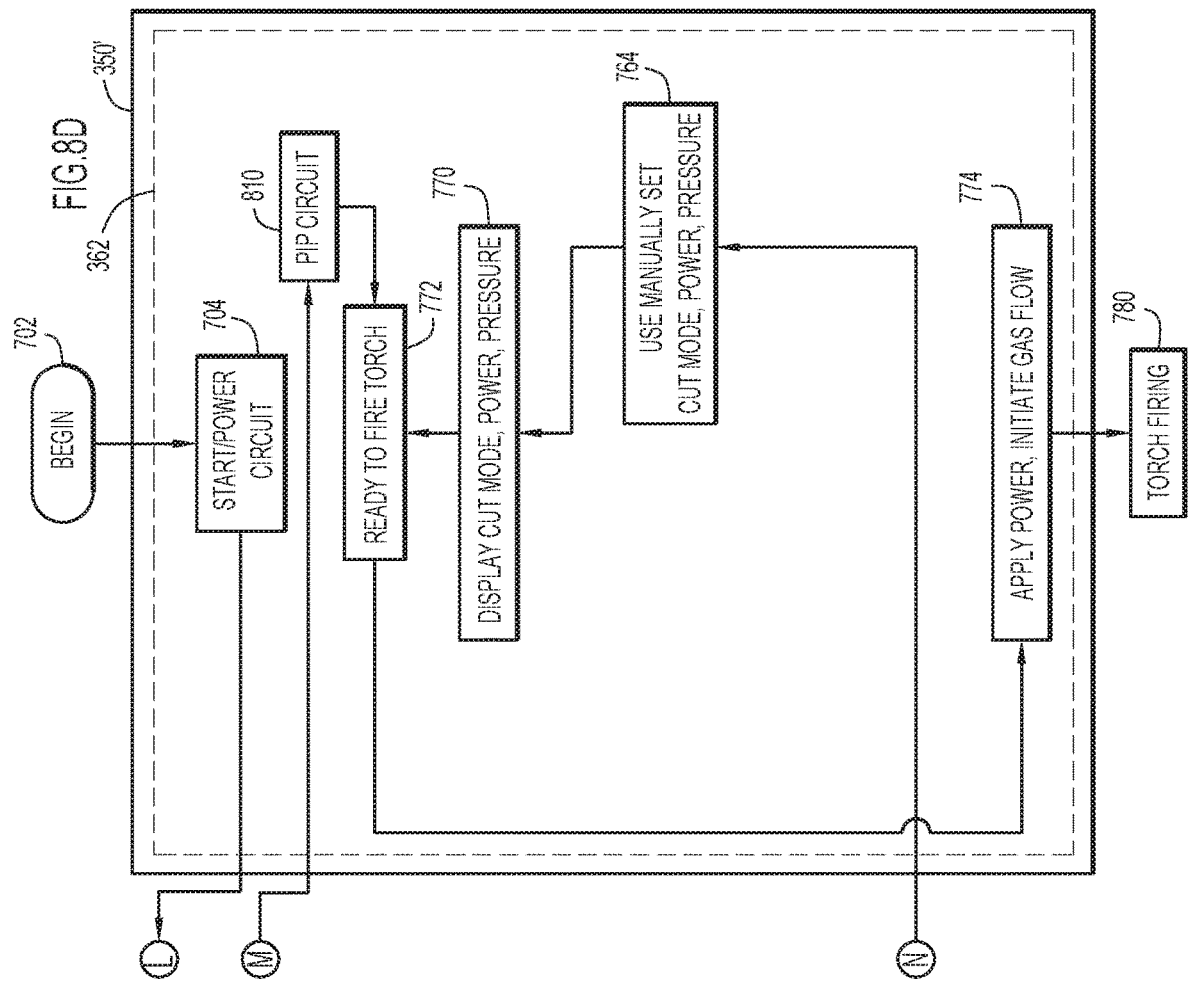

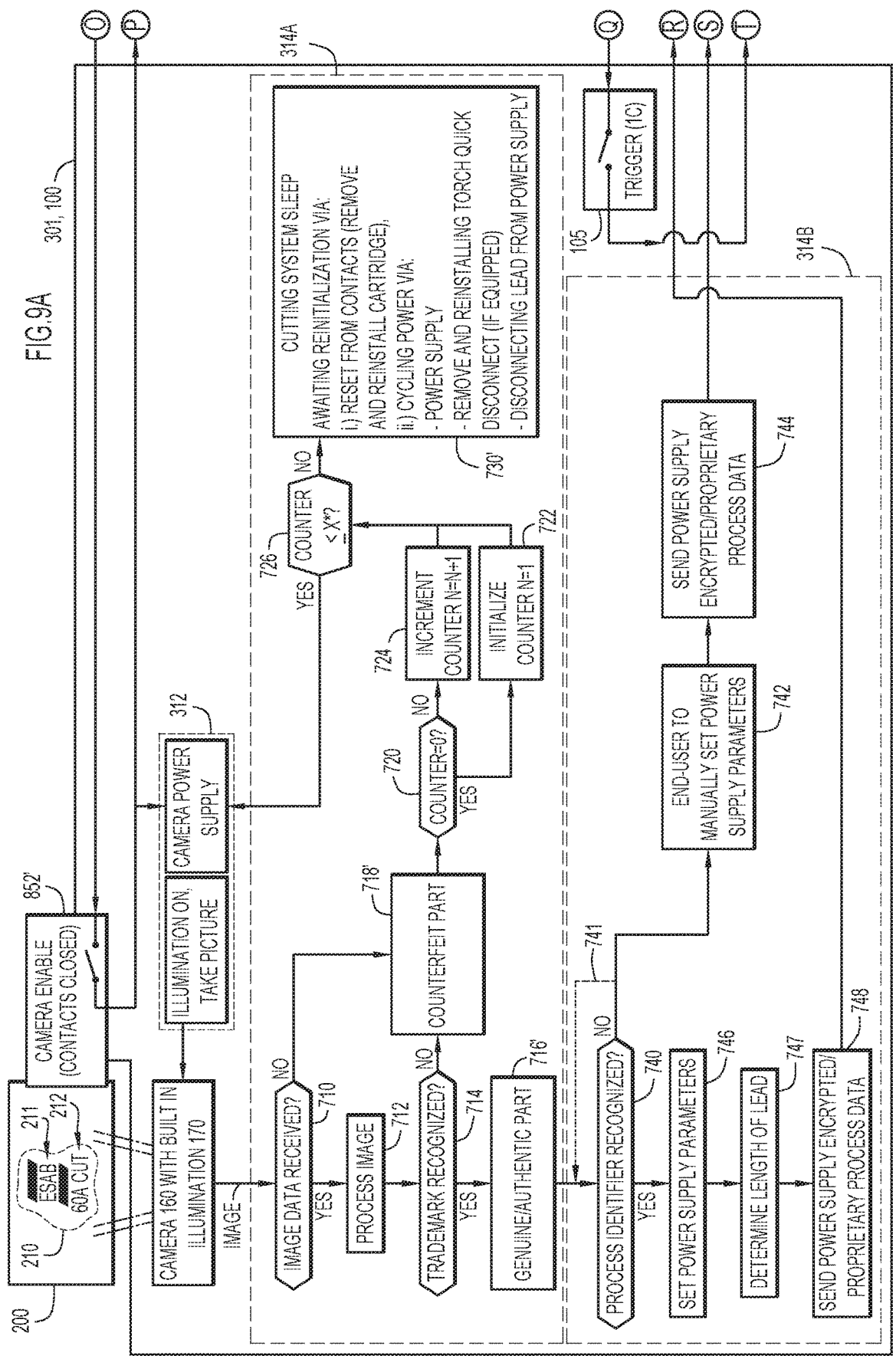

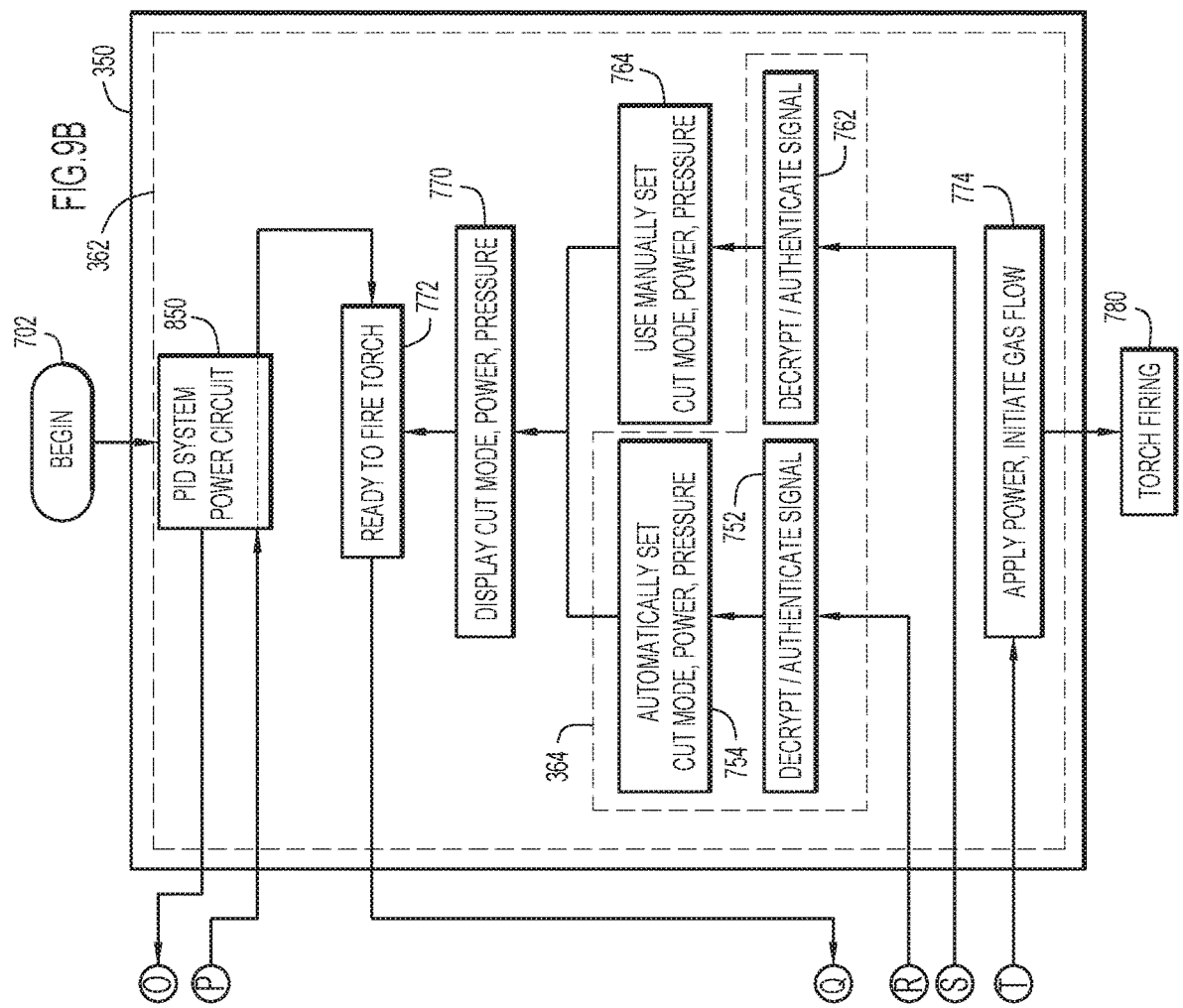

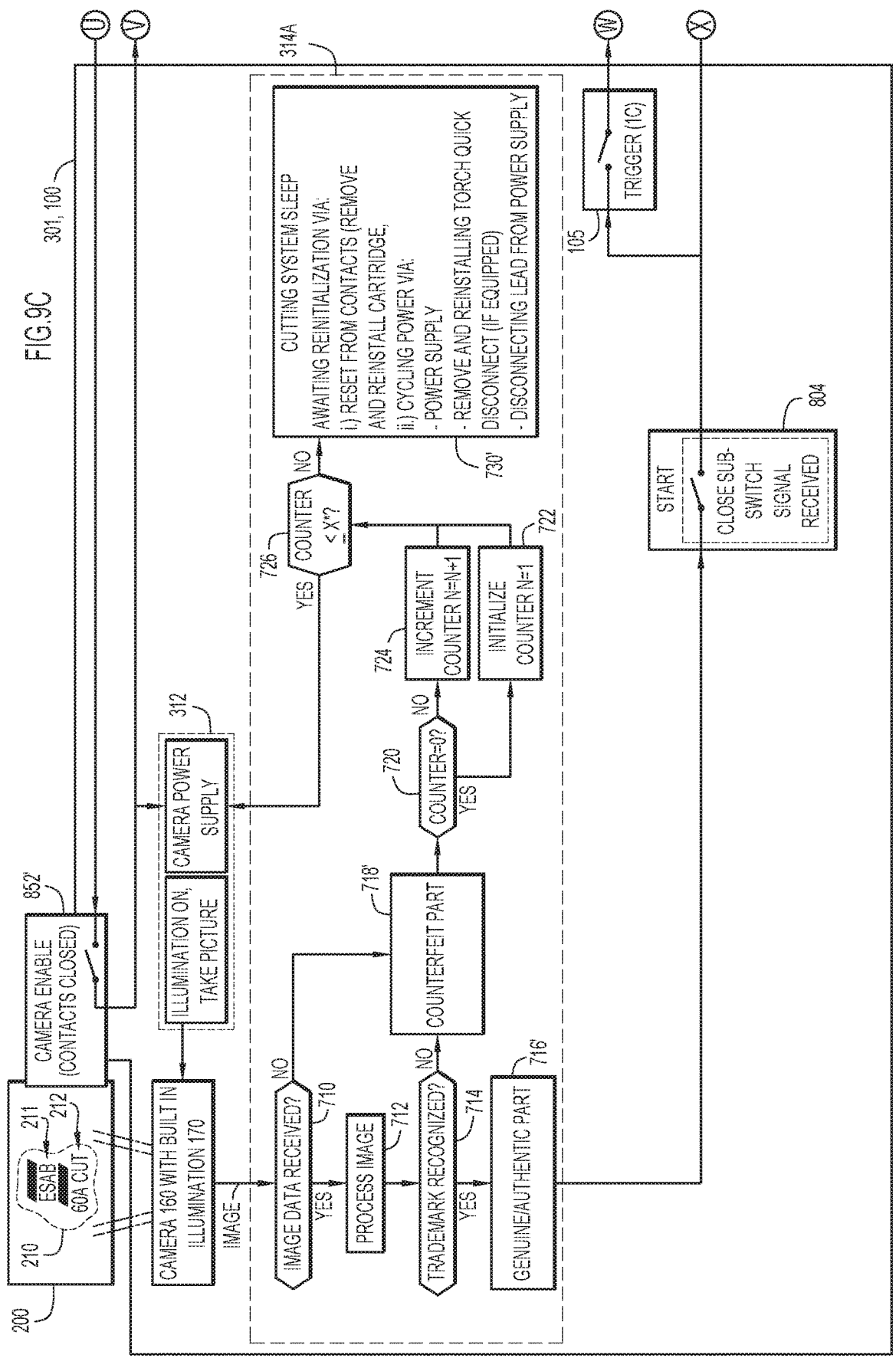

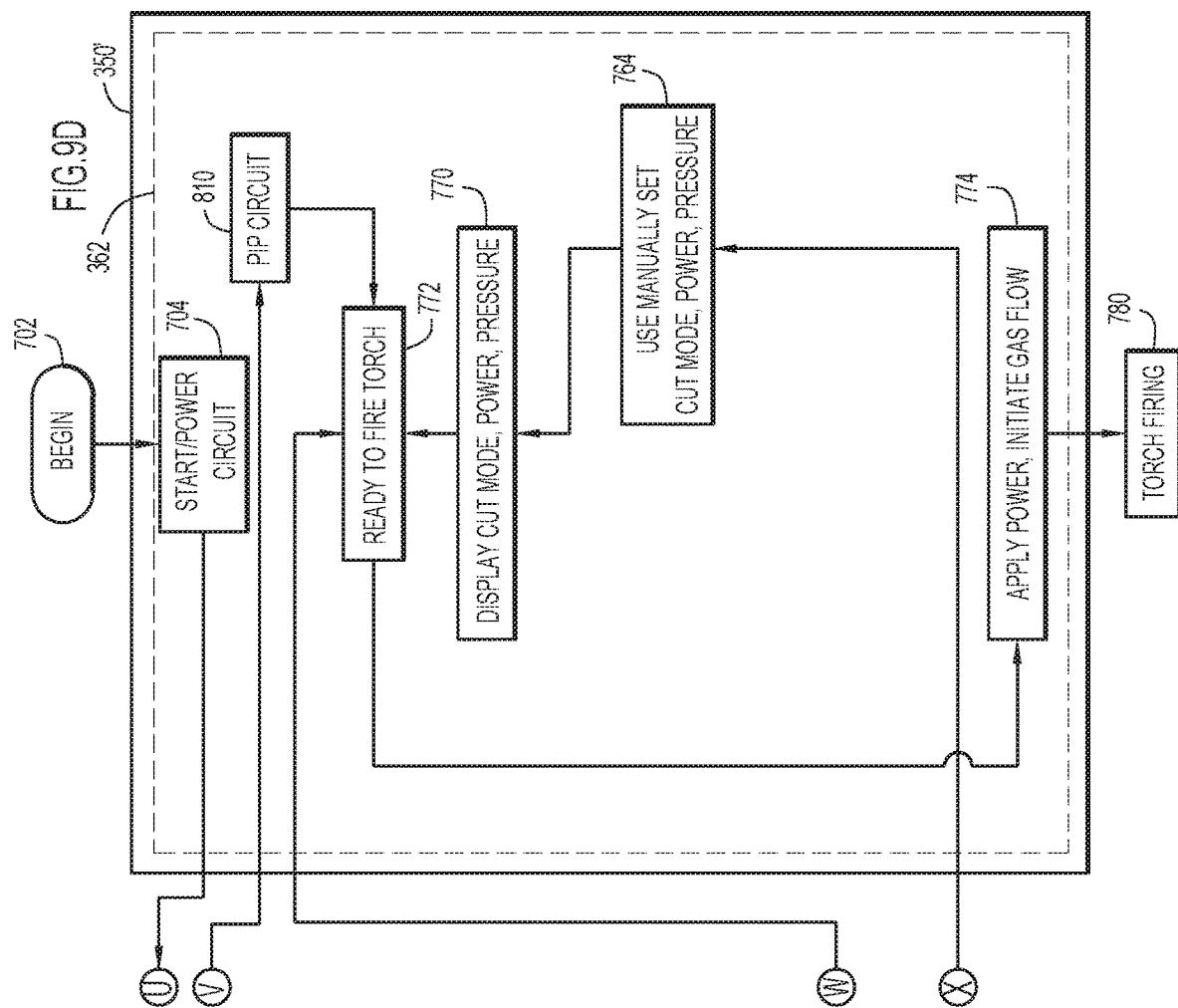

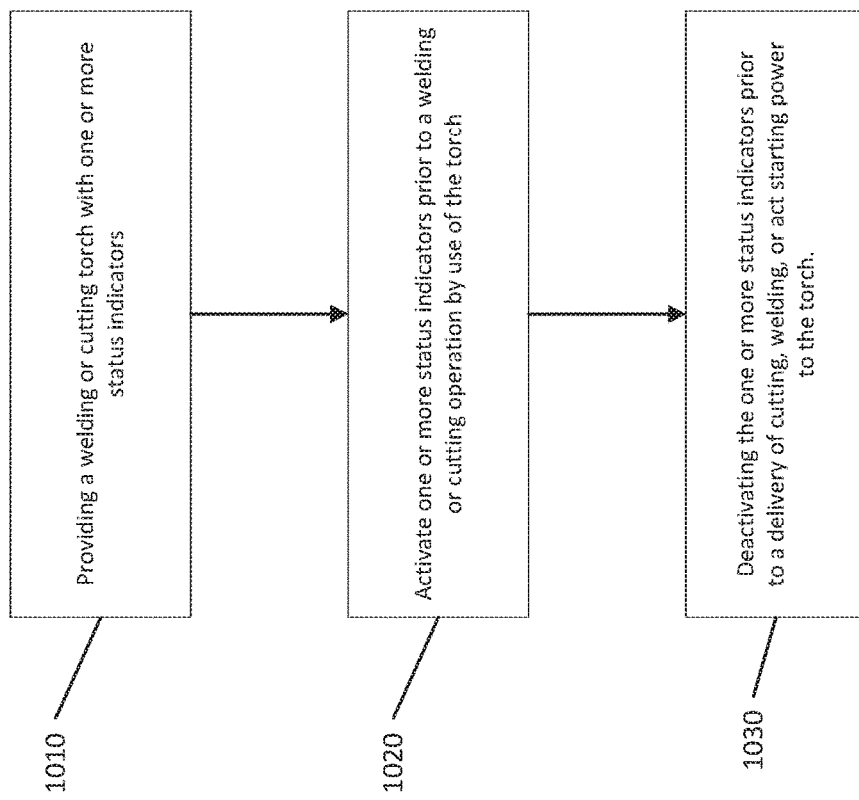

TORCH INDICATOR APPARATUS AND METHODS

TECHNICAL FIELD

The present disclosure relates to welding and plasma cutting systems torches, and more particularly to configurations and methods associated with indicators located on or in the torches.

BACKGROUND

The provision of indicators on welding or plasma cutting torches to provide a status of a process parameter and/or of an operating mode of the torches can provide a distraction to the users of the torches during a time when the welding or plasma cutting process is being carried out. Accordingly, a need remains in the art to reduce or eliminate such distractions.

SUMMARY

The present disclosure is directed towards a welding or plasma cutting system that includes a torch having a torch body. Located on or in the torch body are one or more status indicators that are intended to be in a line of sight of a user of the torch. The one or more status indicators may be, for example, a light emitting diode (LED), a digital or graphical display, or any other type of indicator that is capable of providing information to the user regarding a process parameter and/or an operating state of the torch or of other components of the welding and plasma cutting system. According to some implementations, the welding and plasma cutting system includes control circuitry coupled to the one or more status indicators. The control circuitry is configured to activate the one or more status indicators prior to a carrying out of a welding or plasma cutting operation through use of the torch. The control circuitry is also configured to deactivate the one or more status indicators during a time, or just prior to a time, when the welding or plasma cutting operation is being carried out by the torch. The present disclosure is also directed towards an associated method of operating the torch whereby the one or more status indicators are activated prior to a carrying out of a welding or plasma cutting operation, and subsequently deactivating the one or more status indicators during a time when the welding or plasma cutting operation is being carried out.

The status indicators may provide a status of a process parameter of a utility being supplied to the torches (e.g. power data, process gas pressure data, etc.) and/or of an operating mode of the torches (e.g. automatic mode, manual mode, etc.) and/or other indications, such as those that indicate whether or not interchangeable parts are properly assembled on the torch and/or whether the interchangeable parts are genuine parts properly associated with the type of torch to which they are attached.

By reducing the number of status indicators that are activated on the torch or by eliminating the activation of all status indictors on the torch located in the line of sight of the user during the time the welding or plasma cutting system is being carried out, the user of the torch is presented with fewer distraction during the welding or plasma cutting operation.

In a cutting system, a deactivation of one or more, or all of the status indicators on the torch may occur, for example, upon (1) an arc power being delivered to the torch tip or electrode, (2) an electrical circuit being established across the torch and the workpiece being cut, (3) a threshold current being delivered to the torch, (4) a trigger on the torch being depressed to initiate a delivery of starting arc power to the torch, etc. In a welding system, a deactivation of one or more, or all of the status indicators on the torch may occur, for example, upon (1) a welding power being delivered to the torch, (2) an electrical circuit being established across the torch and the workpiece being welded, (3) a threshold current being delivered to the torch, (4) a trigger on the torch being depressed to initiate a delivery of welding power to the torch, etc.

These and other advantages and features will become evident in view of the drawings and detailed description.

BRIEF DESCRIPTION OF THE DRAWINGS

FIG. 2A is a block diagram representation of a portion of the torch illustrated in FIGS. 1A-1C and an interchangeable torch component, according to an example embodiment.

FIGS. 7A-D, 8A-D, and 9A-D are block diagrams depicting power, data, and logic flows according to example embodiments of the present disclosure.

FIG. 10 is a high-level flow chart depicting operations of indicators included on a torch, according to an example embodiment of the present disclosure.

Like numerals identify like components throughout the figures.

DETAILED DESCRIPTION

Figure 1A:
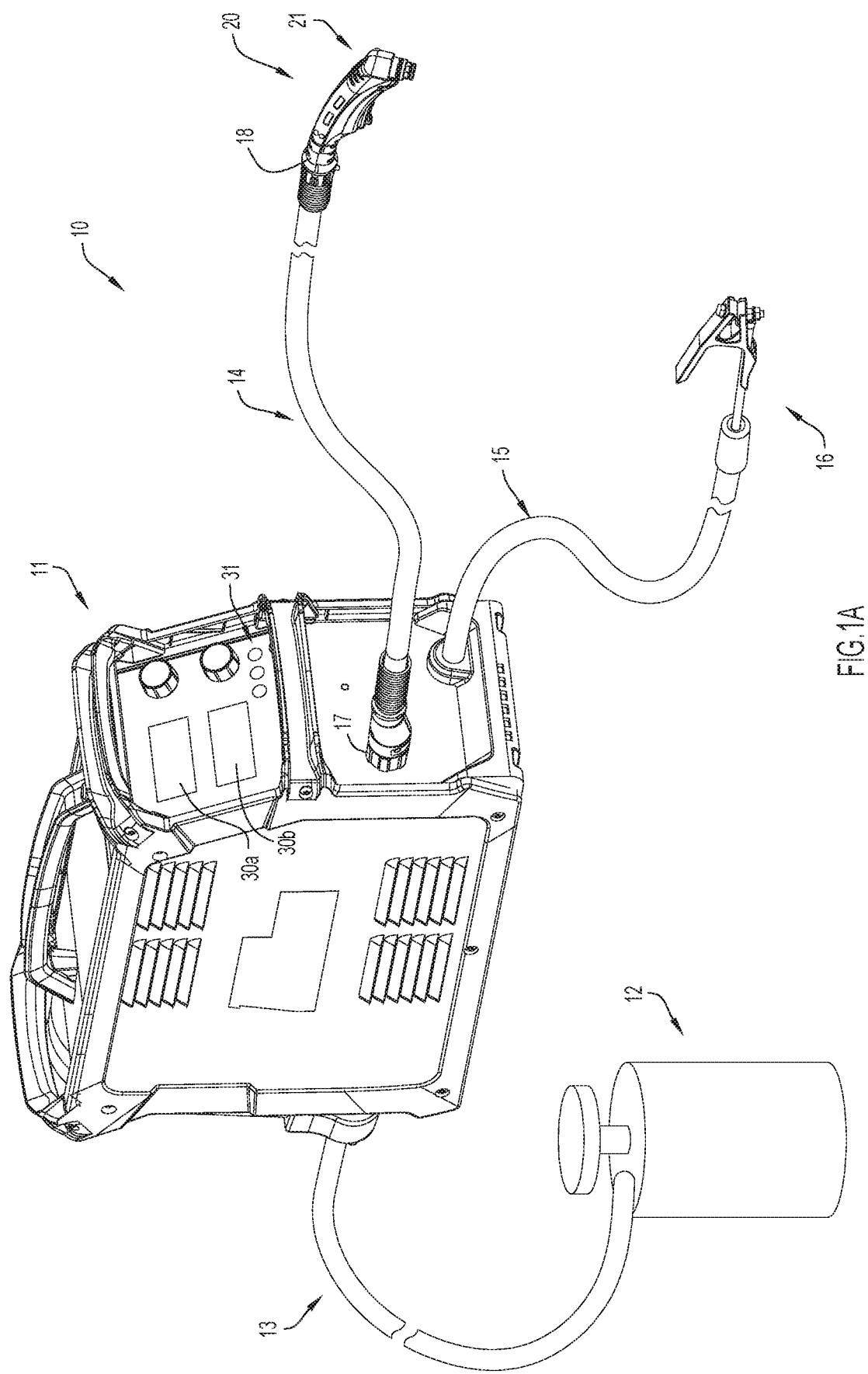
FIG. 1A is a perspective view of a cutting system according to one implementation.

The present disclosure relates to apparatus and methods associated with welding and plasma cutting systems. For the sake of brevity, the written description that follows is primarily directed to plasma cutting systems. This, however, does not limit in any way the applicability of the techniques disclosed and contemplated herein to plasma cutting systems. That is, the techniques disclosed and contemplated herein are also applicable to welding systems and to cutting systems other than plasma cutting systems.

FIG. 1 illustrates an example cutting system 10 in which the techniques presented herein may be carried out. The depicted cutting system 10 includes a power supply 11 that supplies power to a torch assembly 20. The power supply 11 also controls the flow of a process gas from a process gas supply 12 to the torch assembly 20 (however, in other implementations, the power supply 11 might supply the process gas itself). The process gas supply 12 is connected to the power supply via cable hose 13 and the power supply 11 is connected to the torch 21 included in the torch assembly 20 via cable hose 14. The cutting system 10 also includes a working lead 15 with a grounding clamp 16 disposed at an end thereof.

Cable hose 13, cable hose 14, and/or working lead 15 may each include various conductors so that they may transmit data, electricity, signals, etc. between components of the cutting system 10 (e.g., between the power supply 11 and the torch 21 of the torch assembly 20) and, as is illustrated, cable hose 13, cable hose 14, and/or working lead 15 may each be any length. In order to connect the aforementioned components of the cutting system 10, the opposing ends of cable hose 13, cable hose 14, and/or working lead 15 may each be coupled to the gas supply 12, power supply 11, torch 21, or clamp 16 in any manner now known or developed hereafter (e.g., a releasable connection). The cable hose 14 may include a first connector 17 that releasably couples a first end of the cable hose 14 to a port of the power supply 11 and may also include a second connector 18 that releasably couples a second end of the cable hose 14 to the torch 21. Thus, the torch 21 may be releasably coupled to the power supply 11 via a releasable connection formed between the cable hose 14 and the power supply 11 and/or via a releasable connection formed between the cable hose 14 and the torch 21.

The power supply 11 may include one or more status indicators in the form of digital and/or graphical displays 30a and 30b for visually presenting values of certain operating parameters of the cutting system. These may include, for example, a current reading indicative of an amount of current being supplied to the torch 20 and/or a pressure reading indicative of a pressure of a process gas being delivered to the torch 21. The status indicators may also include one or more illuminators 31, such as light emitting diodes, that activate/illuminate to inform a user a status of the power supply 11, or a status of other components in the cutting system. For example, one of the illuminators 31 may be activated/illuminated to inform the user the power supply 11 is operating in automatic mode, while another one of the illuminators may be activated/illuminated to inform the user the power supply is operating in manual mode. The one or more illuminators 31 may also be used to alert the user to certain anomalies, such as non-genuine or incompatible components being installed on the torch.

Figure 1B:
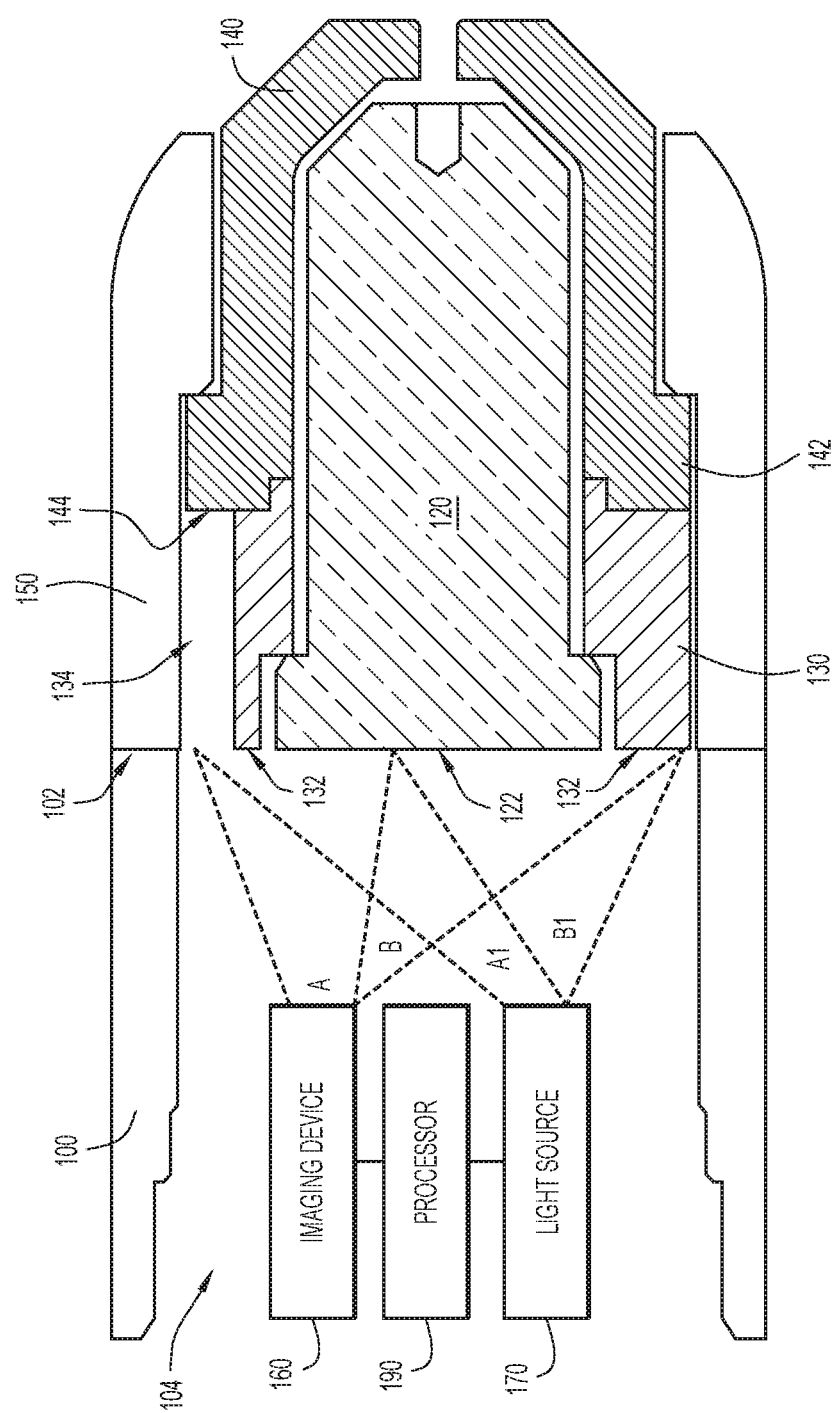
FIG. 1B is a cross-section side view of an end section of a plasma cutting torch according to one implementation.
Figure 1C:
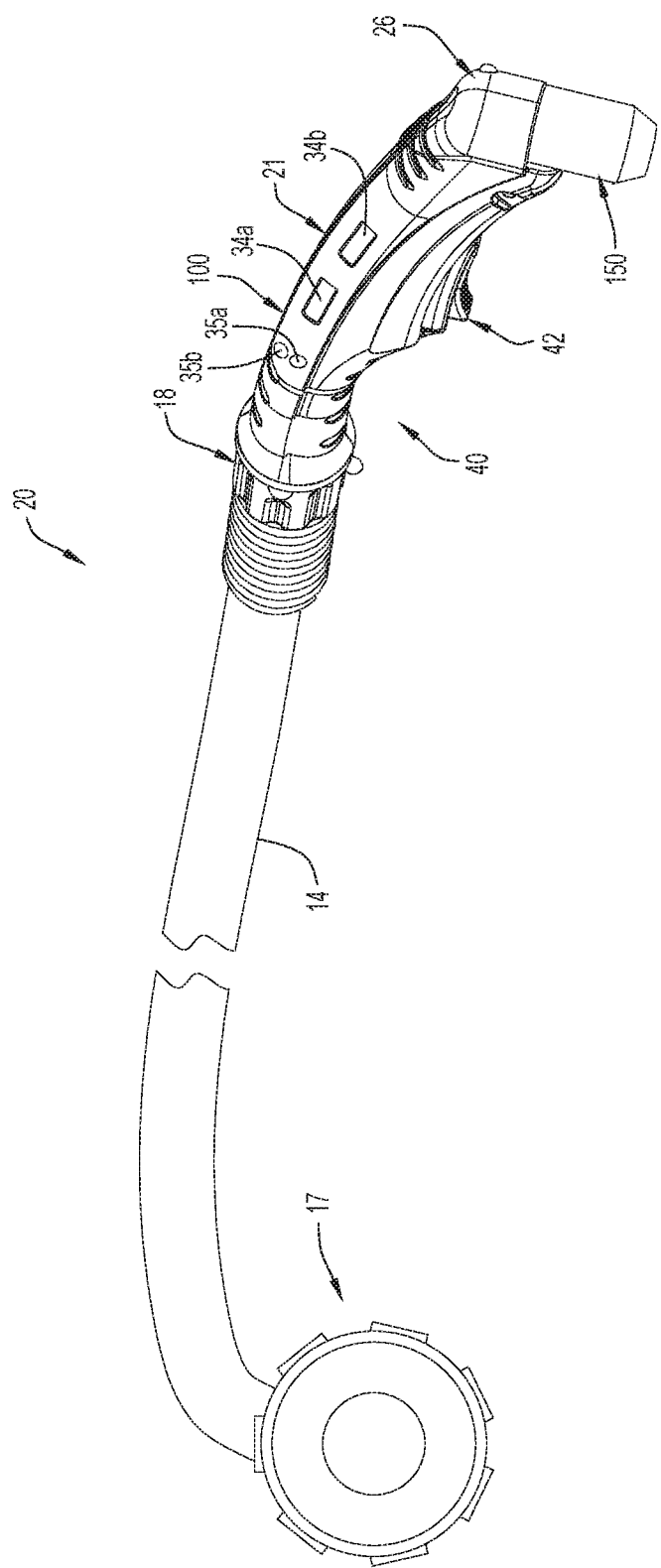
FIG. 1C is an enlarged perspective view of the torch assembly shown in FIG. 1A.

As best seen in FIG. 1C, the torch 21 also includes one or more status indicators that may be in the form of one or more illuminators 35a and 35b and one or more digital or graphical displays 34a and 34b. Although the Figures illustrate these status indicators formed directly on a surface of the torch, in some implementations, the indicators could also be formed on an accessory or assembly that is attached to the torch and/or easily accessible (e.g., in light of sight) for a user/operator while at a workpiece to be cut. For example, illuminators 35a and 35b and/or graphical displays 34a and 34b could be included on a pendant controller attached to a torch and/or the end of a torch lead (e.g., lead 14) closest to the torch (also referred to as the "distal end of the torch lead" since it may be distal from the power supply). Additionally or alternatively, the illuminators 35a and 35b and/or graphical displays 34a and 34b, or any other indicator, could be included on a welding glove or other protective equipment that a user wears during cutting operations. Thus, although the indicators are largely described herein as being on or in the torch body, such description is merely for simplicity and it is to be understood that the indicators described herein may also be included on other equipment that is on or adjacent a user/operator during cutting or welding.

Moreover, according to some implementations the digital and/or graphical displays 34a and 34b are configured to present values of certain operating parameters of the cutting system, text concerning an operating state of the cutting system (e.g., power supply error codes) and/or of the torch and/or graphical representations of the same. These may include, for example, power data indicative of an amount of current being supplied to the torch 20 and/or process gas data that may include the type of gas being used (e.g., oxygen, nitrogen, argon, air, etc.), pressure data and/or flow rate data. The one or more illuminators 35a and 35b may comprise one or more LEDs that illuminate to inform a user a status of the torch 21 itself, a status of the power supply 11, or a status of other components in the cutting system (e.g., power supply error codes). For example, illuminators 35a or 35b may be activated/illuminated to inform the user the cutting system is operating in automatic mode, while illuminators 35b may be activated/illuminated to inform the user the cutting system is operating in manual mode. Additional status illuminators or displays may also be used to alert the user to certain anomalies, such as non-genuine or incompatible components being installed on the torch 21, or the parts of the torch being improperly assembled. Alternatively, a single indicator could be utilized in place of illuminators 35a and 35b and might provide different indications for different statuses. For example, a single illuminator that is illuminated by a tri-color LED might be illuminated different colors to provide different indications.

FIG. 1B illustrates an end portion of the torch 21 according to one implementation. For simplicity, FIG. 1B illustrates a distal end portion of the plasma torch without various components or parts, such as power or gas transfer components, that are typically included in a plasma cutting torch. Instead, FIG. 1B only illustrates select components or parts that allow for a clear and concise illustration of the techniques presented herein. In the depicted implementation, the torch body 100 includes a number of consumable parts, such as, for example, an electrode 120, a torch tip 140, a shield cup 150, and a gas distributor 130. Located in a distal end portion of the electrode 120 is an emitter 29. The gas distributor 130 and the electrode 120 can be installed into the torch body 100 and the torch tip 140 can be installed there over. Alternatively, the gas distributor 130, the electrode 120, and the tip 140 can be installed onto the torch body as a single component (e.g., these components may be coupled to each other to form a cartridge and installed on/in the torch body 100 as a cartridge).

Once the electrode 120 and the tip 140 are installed onto/into the torch body 100, the shield cup 150 is installed around an installation flange 142 of the torch tip 140 in order to secure the torch tip 140 and electrode 120 in place at (and in axial alignment with) an operating end of the torch body 100. Additionally or alternatively, the torch tip 140 and/or electrode 120 can be secured or affixed to the torch body 100 in any desirable manner, such as by mating threaded sections included on the torch body 100 with corresponding threads included on the components. For example, in some implementations, the electrode 120, the torch tip 140, the shield cup 150, the gas distributor 130, as well as any other components (e.g., a lock ring, spacer, secondary cap, etc.) may be assembled together in a cartridge that may can be selectively coupled to the torch body 100. For example, the various components may be coupled to a cartridge body or coupled to each other to form a cartridge.

In use, the plasma torch 21 is configured to emit a plasma arc between the electrode 120 and a workpiece to which the grounding clamp 16 is attached. As shown in FIG. 1B, the torch tip 140 is spaced a distance away from the electrode 120 with there being a process gas flow channel 22 disposed between them. During initiation, power is first supplied to the torch tip 140 (anode) to generate an arc between the torch tip 140 and the electrode 120 (cathode) across the process gas flow channel 22. As process gas flows through channel 22 during arc initiation it is ionized to form an electrically conductive plasma that is then directed out the tip toward an electrically conductive workpiece (e.g. metal workpiece). Once this occurs, power (typically DC power) is supplied to the electrode 120 and an electrical circuit is established between the power source and a ground to which the workpiece is coupled via the grounding clamp 16. A plasma arc that closes the electrical circuit is thus established between the electrode 120 and the workpiece, the plasma arc being sufficient to cut through the workpiece by a localized melting of the material from which the workpiece is made. When power is supplied to the electrode 120, power to the torch tip 140 is terminated.

Turning again to FIG. 1C which depicts an enlarged perspective view on an exterior of the plasma torch 21 connected to the cable hose 14. The torch 21 includes a handle 40 that may comprise a portion of the torch body 100. The handle 40 includes a trigger 42 that is configured to transition between an "off" position when it is not being depressed by a user of the torch and an "on" position when it is being depressed by the user of the torch. The trigger 42 is typically biased to the "off" position, but depending on an operating mode of the torch, this biasing does not necessarily turn the torch off. That said, generally, the trigger 42 is operable to cause an electrical switch located inside the handle 40 or in the power supply 11 to close when the trigger is in the "on" position. The electrical switch is disposed between a power source located inside the power supply 11 and the electrode 120. Hence, when the trigger is in the "on" position the power source is electrically coupled to the electrode 120. In a first operating mode (commonly referred to as "2 T" mode), the user/operator may be required to keep the trigger 42 depressed to keep the switch closed and keep power flowing to the electrode 120. However, in a second operating mode (commonly referred to as "4 T" mode), power may continue flowing to the electrode 120 even after the user/operator releases the trigger 42 subsequent to a first trigger actuation. Specifically, in 4T mode, a user may actuate trigger 42 to start cutting, release the trigger 42 during a cut, and actuate the trigger 42 again to stop cutting. According to some implementations, the trigger 42 is also operable to control the delivery of the process gas from the power supply 11 to the torch 21.

In a cutting system like that discussed above, in order to minimize a diversion of the user's attention away from the cutting operation being performed, a deactivation of one or more, or all of the status indicators on the torch 21 may occur, for example, upon (1) an arc power being delivered to the torch tip 140 or electrode 120, (2) an electrical circuit being established across the torch electrode 120 and the workpiece being cut, (3) a threshold current being delivered to the torch, (4) a trigger on the torch being depressed to initiate a delivery of starting arc power to the torch tip 140 or electrode 120, etc.

According to some implementations, as shown in FIG. 1B, the torch assembly 20 also includes an imaging device 160 that, in the depicted implementation, is disposed within the torch body 100. More specifically, the torch body 100 defines an interior cavity 104 and the imaging device 160 is positioned within the interior cavity 104 so that the imaging device 160 can optically acquire one or more images of and/or image data representative of the operative end 102 of the torch body 100. That is, the imaging device 160 is positioned to optically acquire one or more images of and/or image data representative of interchangeable torch components installed on the operative end 102 of the torch body 100. In some embodiments, the imaging device 160 need not have a direct line of sight to the operative end 102 and, instead, may view the operative end 102 of the internal cavity 104 via any optics components, such as mirrors, fiber optics, light pipes, etc. now known or developed hereafter. Put another way, the imaging device 160 may be optically coupled to the operative end 102 of the internal cavity 104 via any optics components now known or developed hereafter. In fact, in some embodiments, the imaging device 160 need not be disposed within the torch assembly 20 and can be disposed on or near an outer surface of the torch body 100 and optically coupled to the operative end 102 of the interior cavity 104. That being said, embodiments with an internal imaging device 160 (i.e., an imaging device 160 disposed within interior cavity 104) may be sleeker, more efficient, and less likely to malfunction than embodiments including an imaging device coupled to an exterior surface of the torch body 100 or otherwise disposed externally of the torch assembly 20 (e.g., an "external imaging device 160").

Generally, the imaging device 160 may be any device or component capable of optically acquiring two-dimensional and/or three-dimensional images and/or image data representative of an image. For example, the imaging device 160 may be a single camera that captures two-dimensional images of any surfaces (and one or more markings included thereon) in its field of view. Additionally or alternatively, the imaging device 160 may include multiple imaging components, such as an array of cameras, multiple cameras, lasers, LIDAR, ultrasound, sonar, radar, infrared imaging device, etc., that allow the imaging device 160 to acquire two-dimensional images, three-dimensional images (e.g., to detect etchings, as is described in further detail below), and/or image data (e.g., data from an optical scan with a laser that is representative of an image).

As is illustrated in FIG. 1B, in some embodiments the imaging device 160 may have a field of view "A" that spans only a portion (e.g., half) of the operative end 102 of the torch body 100, but, in other embodiments, the imaging device 160 may have a field of view that spans the entire torch body 100 ("A"+"B"). As is explained in further detail below, in some embodiments, the interchangeable torch components (e.g., consumable components) may be keyed to align any markings with a certain radial location of the torch body (e.g., a "top" of the torch body). In these embodiments, it may only be necessary for the imaging device 160 to have a field of view "A" that covers the radial location (e.g., only have a field of view that covers a segment of the cylindrically-shaped torch body 100).

Moreover, in some embodiments, the various components may include pathways, openings, or other such features (e.g., embedded fiber optics) to expand the field of view of an imaging device 160 beyond the components that are immediately adjacent to the imaging device 160. For example, in FIG. 1B the imaging device 160 has a direct line of sight to a back surface 122 of the electrode 120 and a back surface 132 of the gas distributor 130, but the imaging device 160 may not have a direct line of sight to a back surface 144 of the torch tip 140. Thus, the gas distributor 130 defines a pathway 134 (e.g., a fiber optics pathway) that provides the imaging device 160 with a line of sight to a specific portion of the back surface 144 of the torch tip. Consequently, in the depicted embodiment, the imaging device is positioned to optically acquire one or more images of and/or image data representative of the back surface 122 of the electrode 120, the back surface 132 of the gas distributor 130, and the back surface 144 of the torch tip 140, regardless of whether the imaging device 160 has a field of vision defined by "A" or defined by "A"+"B."

In some embodiments, the torch assembly 20 may also include a light source 170 configured to illuminate a field of view (e.g., "A" or "A"+"B") of the imaging device 160. That is, if the imaging device 160 has a field of view "A," the light source 170 may illuminate at least the field of view "A", as is illustrated by "A1," and if the imaging device 160 has a field of view "A+B," the light source 170 may illuminate at least the field of view "A+B", as is illustrated by "A1+B1." The light source 170 may be any device that can illuminate surfaces of interchangeable torch components in a particular field of view, such as a light-emitting diode (LED). Additionally or alternatively, light emitted during operations of the torch (i.e., light emitted by a plasma arc) may supplement or replace light from the light source 170 included in or on the torch body 100 and, thus, the welding/cutting operations may also be referred to as the light source 170. If the torch assembly 20 includes a light source 170, the light source may be positioned within the internal cavity 104 of the torch body 100 and may be optically coupled to the operable end of the internal cavity 104 via any optics components, such as mirrors, fiber optics, light pipes, etc. now known or developed hereafter.

Although FIG. 1B illustrates a single imaging device 160 and a single light source 170, in some embodiments, the torch 21 may include multiple imaging devices 160, each dedicated to a specific type of interchangeable torch component (e.g., a first imaging device for electrodes, a second imaging device for torch tips, etc.). In other embodiments, a single imaging device 160 may be suitable for imaging one or more markings 210 (see FIGS. 2A-B) included on any components 200 installed onto the torch body 100. Embodiments including multiple imaging devices 160 may also include multiple light sources 170. The light sources 170 may each be dedicated to a single imaging device 160, a set of imaging devices 160, or some combination thereof. Alternatively, a single light source 170 might provide light for any imaging devices 160 included in a torch 20.

With continued reference to FIG. 1B, the torch assembly 20 also includes a processor 190. The processor 190 included in the torch body 100 may operate any combination of imaging devices 160 and light sources 170. Moreover, as is described in further detail below, the processor 190 may identify the components based on their one or more markings or transmit data to the power supply that allows the power supply to identify the components based on their one or more markings. Thus, regardless of how the interchangeable electrode 120, the interchangeable gas distributor 130, the interchangeable torch tip 140, and/or the interchangeable shield cup 150 are attached to the operative end 102 of the torch body 100, if any of these interchangeable torch components (as well as any other interchangeable torch component included in or on the torch body 100) includes one or more markings 210 (see FIG. 2A), the component can be identified based on one or more images of and/or image data representative of the one or more markings 210 acquired by the imaging device 160 (with the acquisition of images and/or image data potentially facilitated by illumination from light source 170).

Figure 2B:
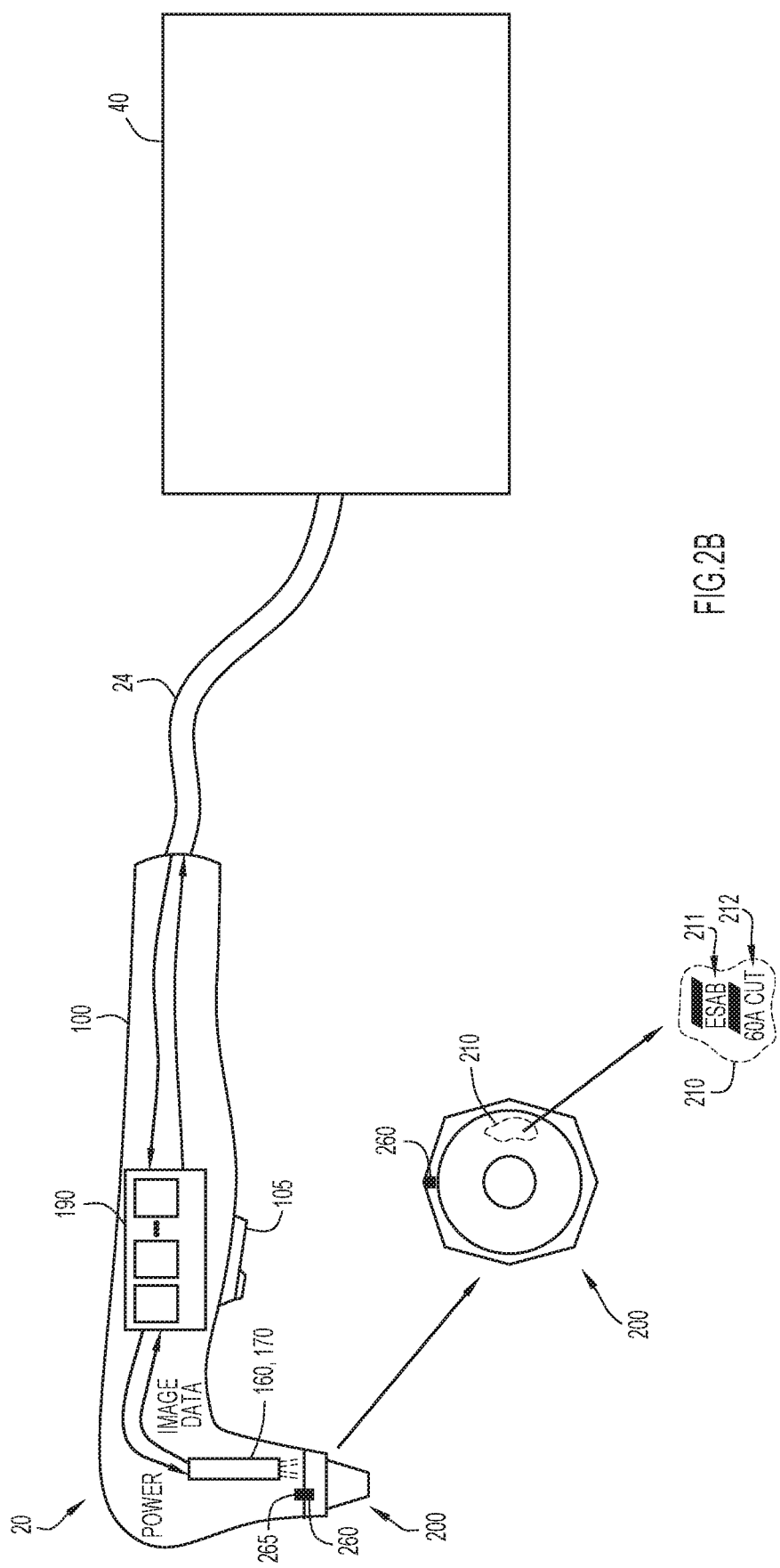
FIG. 2B is a perspective view of the torch assembly of FIGS. 1A-1C, according to an example embodiment of the present disclosure.

FIGS. 2A-B provide a block diagram representation of the torch of FIG. 1B. Consequently, like parts from FIG. 1B are labeled with the same part numbers in FIGS. 2A-B (and the description of these parts included above may be applicable to the like parts shown in FIGS. 2A-B). For example, the description of torch body 100 included above may be applicable to the torch body 100 depicted in FIG. 1B and, thus, the torch body 100 can receive an interchangeable consumable component 200 (which may be representative of electrode 120, gas distributor 130, torch tip 140, or shield cup 150) with one or more markings 210. For simplicity, the markings 210 may also be referred to herein as indicia 210, with the understanding that the term "indicia" may refer to one or more markings despite indicia being plural. In FIGS. 2A-B, the indicia 210 are included on a back surface 202 of the component 200; however, it is to be understood that this location is merely an example. In other embodiments, any interchangeable torch component 200 that is installable onto the torch body 100 (including interchangeable torch components shown in FIG. 1B (e.g. electrode 120, gas distributor 130, tip 140, shield cup 150, etc.) as well as any other interchangeable torch components that are not shown in FIG. 12 such as various consumables) may include indicia 210 on any location that is viewable by the imaging device 160 (either directly or via optics components).

Generally, an interchangeable torch component 200 can be manufactured with indicia 210 included thereon or the indicia 210 can be added to a surface of the component in any manner now known or developed hereafter. For example, indicia 210 may be permanently added to an interchangeable torch component (e.g., a consumable) by permanently marking the torch component with characters and/or symbols (e.g., with a laser, etching, printing, stamping, etc.). Alternatively, indicia may be permanently or temporarily added to an interchangeable torch component (e.g., a consumable) with a label, sticker, or other such item/method. The characters and/or symbols of indicia 210 correspond to the component's manufacturer and application (e.g., purpose, usage, and characteristics). For example, in FIG. 2A, interchangeable component 200 (represented as electrode 120, gas distributor 130, torch tip 140, or shield cup 150) includes indicia 210 that reads "ESAB 60 A GOUGE." This indicates that the part was manufactured by ESAB (and, thus, may be suitable for an ESAB torch body) and is suitable for plasma gouging with 60 Amps. However, despite this example, the characters and/or symbols included in indicia 210 need not be human-readable (markings that are not human-readable may be referred to herein as machine-readable), provided that the imaging device 160 can optically acquire one or more images of and/or image data representative of the indicia 210 (even if the acquisition requires illumination from a light source 170) and that optical recognition techniques can be applied to the characters, symbols, or any other identifier/indicia.

The indicia 210 need not be two-dimensional and, instead, the indicia 210 may be or include three-dimensional features. For example, the indicia 210 may include a raised or carved portion. Three-dimensional features can be scanned for symbols and characters as well as profile and depth (e.g., with a laser, sonar, radar, etc.) and the profile and depth may be considered when the indicia are processed with optical recognition techniques. However, the indicia are passive, mechanical indicia, insofar as "passive" indicates that the indicia do not emit any signals, store or transmit any electronic data, or otherwise perform any actions. Put another way, the indicia/markings are dumb (as opposed to being smart indicia that might interact with a computing device). Meanwhile, "mechanical" indicates that the markings/indicia are physical markings formed or created from physical additive or subtractive processes applied to an interchangeable component. As some examples, the mechanical markings may include holes formed with drills, letters etched into a material, symbols printed onto a material, shapes etched onto a material, etc. In at least some embodiments, the markings are also non-functional insofar as the markings do provide an attachment point, a cooling feature, and/or some other functional aspect of an interchangeable component and, instead, are provided on the interchangeable component in addition to functional features.

Irrespective of the physical characteristics of the indicia (e.g., irrespective of whether the indicia are two-dimensional or three-dimensional, include holes or etched shapes, etc.), the indicia 210 (e.g., the one or more markings) are included on a portion of an interchangeable component 200 that will be within a field of view of the one or more imaging devices included in the torch assembly (e.g., field of view A from FIG. 1B). That is, the indicia 210 are provided in a location that is optically viewable from a position interior of the operative end 102 of the torch 22 (see FIG. 1B). For example, in at least some embodiments, the indicia 210 may be included at a radially exterior position on a rear surface (e.g., an end wall, as opposed to a side wall) of a consumable component. In at least some embodiments, this position is unobstructed (e.g., uncovered or not blocked by other components) and, thus, is optically viewable by the one or more imaging devices 160 included in the torch assembly.

By comparison, typically interchangeable components (e.g., consumable components) include branding information (or other such markings) on a larger surface (e.g., a side wall) of the component, where it is easier to include the branding information (e.g., since there is more surface area available to include the information). Additionally, typically, interchangeable components (e.g., consumable components) include mechanical mating features (e.g., threading, coolant passages/connections, etc.) at a rear end wall and, thus, it is difficult to include a marking on a rear end wall (or other such optically viewable portions of the component). Here, the one or more interchangeable components are marked on an optically viewable surface to ensure that one or more imaging devices included in the torch assembly can acquire an image and/or image data of the one or more markings included on the one or more interchangeable components. For example, in FIG. 1B, electrode 120 may include one or more markings on its rear surface 122, which may be an optically viewable surface, insofar as the surface may be viewable from the operative end 102 of the torch body 100.

Also irrespective of the physical characteristics of the indicia, in at least some embodiments, the component 200 includes features that align the indicia 210 with a specific portion of the torch body 100. In these embodiments, the alignment ensures that the indicia 210 are viewable by the imaging device 160 included in the torch body 100. For example, the component 200 and the torch body 100 may include markings (or any other type of mechanical keying) that indicate how to align the component 200 with the torch body 100 during installation of the component 200 onto the torch body 100 to ensure the indicia 210 will be optically aligned with the imaging device 160.

Moreover, although FIGS. 2A-B illustrate only a single component 200 with indicia 210, one or more interchangeable torch components 200 may be installed onto a torch body 100 and the torch 20 may be configured to detect each of these components 200. In some embodiments, multiple components may be associated with a single marking or set of markings 210 (e.g., if multiple components are combined in a cartridge) and the one or more markings 210 may be specific to the combination of components. For example, multiple components could include a portion of an overall indicia pattern and the overall indicia pattern might be complete only when all of the components are connected to each other. As another example, a cartridge body might include one or more markings and might be configured to receive only specific consumable components (and the one or more markings might represent all of the components in the cartridge body). Alternatively, multiple components may each include their own indicia 210. In embodiments where various components include their own indicia 210, indicia 210 may be compared across components to determine cross-component compatibility. As mentioned, in some embodiments, the torch 20 may include multiple imaging devices, each dedicated to a specific type of interchangeable torch component 200 (e.g., a first imaging device for electrodes, a second imaging device for torch tips, etc.), but in other embodiments, a single imaging device 160 may be suitable for imaging indicia 210 included on any components 200 installed onto the torch body 100.

As was mentioned above (and is explained in detail below), the processor 190 may be configured to process an image 162 (or image data) acquired by the imaging device 160 (as opposed to simply being configured to operate one or more imaging devices 160 and one or more light sources 170). For example, in FIG. 2A, the processor may apply OCR techniques to image 162 (which includes characters that provide "ESAB 60 A GOUGE."). However, in various embodiments, any optical recognition techniques now known or developed hereafter may be applied to an image 162 acquired by the imaging device 160. Similarly, any optical techniques now known or developed hereafter may be applied to acquired image data in order to identify markings from data (e.g., to stitch together data from an optical scan and subsequently identify markings with optical recognition techniques). Generally, optical recognition techniques may involve comparing an acquired image and/or image data to a library of data and/or images to try to find a match.

Figure 3:
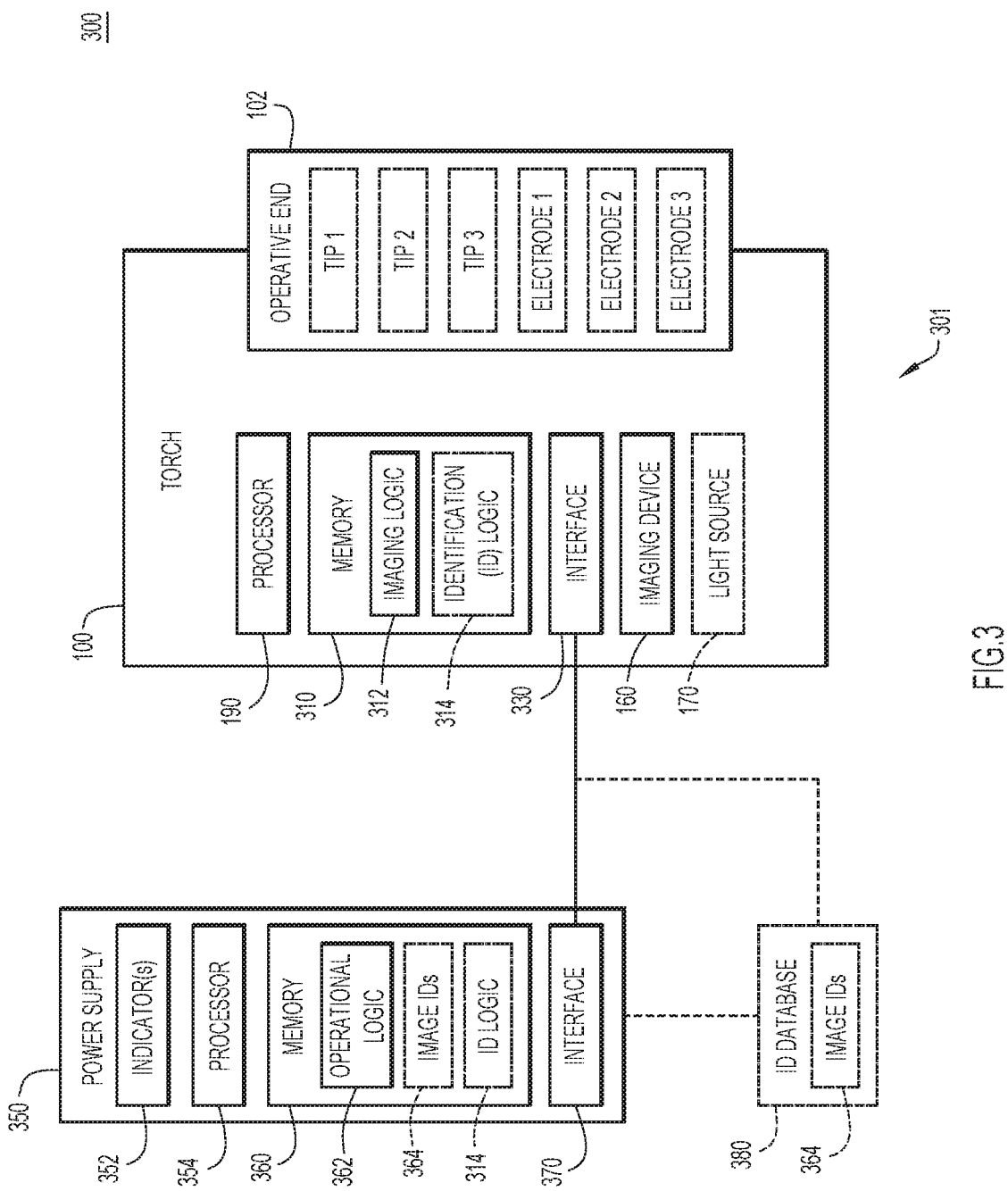
FIG. 3 is a block diagram of a torch assembly and the power supply of FIG. 1A, according to an example embodiment of the present disclosure.

FIG. 3 depicts a high-level block diagram of a system 300 (e.g., cutting system 10) configured in accordance with the present invention. The system 300 includes a torch assembly 301 (such as the torch assembly 20 depicted in FIGS. 1A-C) and a power supply 350 (such as the power supply 11 depicted in FIG. 1A) that is configured to adjust operational parameters, such as power parameters or gas flow settings, of a welding or cutting operation. As was described above in connection with FIG. 1B, the torch assembly 301 may selectively receive interchangeable torch tips and electrodes, among other interchangeable torch components. Consequently, tips 1-3 and electrodes 1-3 are shown in dashed lines as possibly being installed on the operative end 102 of torch 20. As was also described above, the torch assembly 301 may also include a processor 190. Additionally, the torch assembly 301 may include a memory 310, and an interface 330 that provides a connection to an interface 370 included in the power supply 350. In some embodiments, the interface 330 included in the torch assembly 301 may provide a power and data connection to the power supply 350 (i.e., via separate transmission cables). For example, each interface 330 may include a wireless interface unit and a power interface unit, with the wireless interface unit enabling wireless data transfer between the torch assembly 301 and the power supply 350 and the power interface unit enabling wired power transfer from the power supply 350 to the torch 30.

Generally, the processor 190 (e.g., a microprocessor) may execute instructions included in memory 310 (i.e., imaging logic 312) in order to operate various components included therein or coupled thereto, such as one or more imaging devices 160 and one or more light sources 170. In some embodiments, the processor 190 may also execute imaging logic 312 to determine if required/necessary parts are in place in/on the torch assembly 301, as is discussed in further detail below. Moreover, in some embodiments, the processor 190 may execute Identification (ID) logic 314 to identify a component installed therein (i.e., electrode 1-3 or tip 1-3), as was discussed briefly above. Still further, the processor 190 may execute instructions included in memory 310 (i.e., imaging logic 312) in order to send data and/or instructions to the power supply 350. The operations of the processor when executing the imaging logic are discussed in further detail below in connection with FIG. 4.

Meanwhile, the power supply 350 may also include a processor 354 configured to execute instructions stored in its memory 360 (i.e., operational logic 362 and ID logic 314). An image ID data structure 364 (i.e., a table) that correlates data received from the torch assembly 301 with component identities and/or one or more operating parameters may also be stored in the memory 360 of the power supply 350. Alternatively, the image ID data structure 364 can be stored in an external ID database 380 that may be accessed by the power supply 350 and/or torch assembly 301 (i.e., through a network interface unit included in interface 370 and/or interface 330, respectively). As is described in further detail below in connection with FIGS. 5 and 6, in at least some embodiments, the power supply processor 354 may execute the ID logic 314 to correlate data received from the torch assembly 301 with a component identity (from image IDs 364) to identify an installed component.

Additionally or alternatively, the power supply processor 354 may execute the operational logic 362 to adjust operational parameters of a welding or cutting operation while an identified component is disposed in the torch. In at least some embodiments, the operational parameters may include automated cutting/welding settings (e.g., settings controlled by a computer numerical control (CNC) controller), power/current settings, and/or gas flow settings. As some examples, the automated cutting/welding settings include travel speed, pierce height, standoff height/cut height, and/or pierce dwell time. By comparison, gas flow settings, in at least some embodiments, may include the type of gas being used (e.g., oxygen, nitrogen, argon, air, etc.) a pressure or flow rate, gas function (e.g., pre-flow and post-flow, cut gas, shield gas, etc.), and/or gas sequencing. In some embodiments, the power supply processor 354 may also execute operational logic 362 to determine if required/necessary parts in place in/on the torch assembly 301 (e.g., instead of processor 190 executing imaging logic 312 to make this determination), as is discussed in further detail below.

Still further, although not shown, in some embodiments, the interface 370 of the power supply 350 and/or the interface 330 of the torch assembly 301 may enable a connection (wired or wireless) to one or more external computing devices and the external computing device(s) may include ID logic 314 and/or operational logic 362 so that the external computing device can analyze an image or image data and communicate with the power supply 350 and/or torch assembly 301, adjust operational settings of the power supply 350, or otherwise execute logic associated with at least a portion of the techniques presented herein.

Generally, memory 310 and memory 360 included in the torch assembly 301 and power supply 350, respectively, may be configured to store data, including instructions related to operating various components or any other data. Moreover, memory 310 and memory 360 may include read only memory (ROM), random access memory (RAM), magnetic disk storage media devices, optical storage media devices, flash memory devices, electrical, optical or other physical/tangible (e.g., non-transitory) memory storage devices. Thus, in general, memory 310 and memory 360 may be or include one or more tangible (non-transitory) computer readable storage media (e.g., a memory device) encoded with software comprising computer executable instructions. For example, memory 310 and/or memory 360 may store instructions that may be executed by its associated processor (processor 190 and processor 354, respectively) for automatically identifying a component installed in/on a torch of torch assembly 301 and/or for automatically adjusting operational parameters in response to the automatically identifying, as described herein. In other words, memory 310 and/or memory 360 may include instructions, that when executed by one or more processors, cause the one or more processors to carry out the operations described herein.

Still referring to FIG. 3, the power supply may also include a status indicator or indicators 352. In some instances, the status indicator(s) 352 include a current gauge, pressure gauge, fault gauge, and/or other operational control signals. Additionally or alternatively, the status indicator(s) 352 may include a display that can display the identity of currently identified components and/or display warnings when a user attempts to change power settings to unsafe settings.

Figure 4:
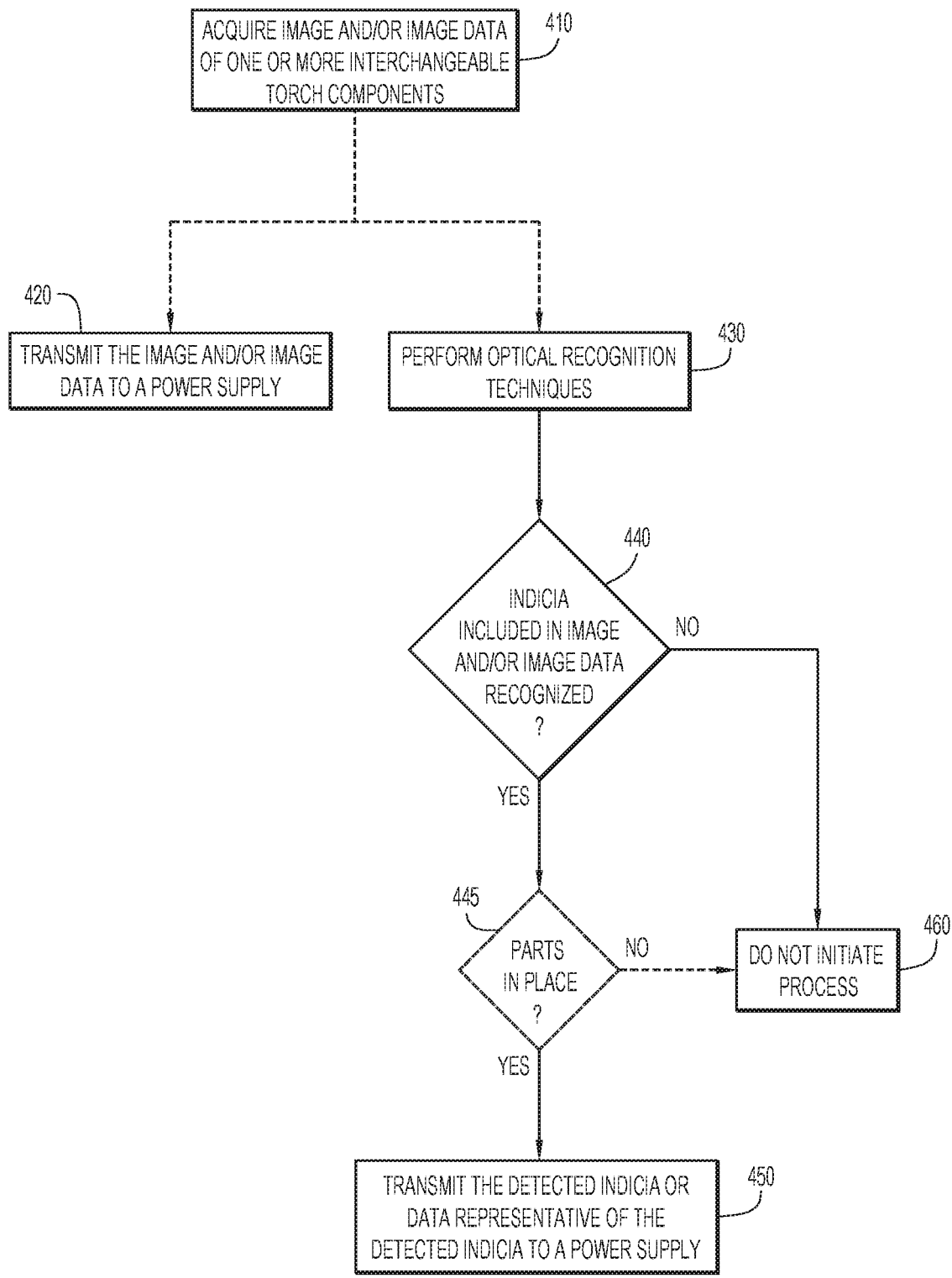
FIG. 4 is a high-level flow chart depicting operations of the torch illustrated in any of FIGS. 1A-3, according to an example embodiment of the present disclosure.

As mentioned, FIG. 4 illustrates a high-level flow chart of the operations performed by torch assembly 301 of FIG. 3 (which, again, may be representative of torch assembly 20 from FIGS. 1A-C), configured in accordance with an example embodiment. Initially, at 410, one or more imaging devices (e.g., imaging devices 160) optically acquire one or more images of and/or image data representative of one or more interchangeable torch components (e.g., consumable components) that are installed in/on the torch assembly 301 (i.e., consumable components included in a torch of torch assembly 301). In some embodiments, the one or more imaging devices constantly optically acquire one or more images of and/or image data representative of the operative end of the torch body and any interchangeable torch components installed therein. Alternatively, the one or more imaging devices may only optically acquire one or more images of and/or image data representative of the operative end of the torch body and any interchangeable torch components installed therein at predetermined intervals. The predetermined intervals may be time-based (e.g., every 30 seconds) or action-based. Exampled of predetermined, action-based intervals include intervals that start in response to: a powering-on of the power supply; a cycling of the power supply; a "fire" signal being received at a mechanized torch; an actuation of a trigger included on the torch; and/or a locking of interchangeable torch components into place on the torch body. In some embodiments, the light source included in the torch body may only illuminate the interchangeable torch components (and any indicia included thereon) at the predetermined intervals.

In some embodiments, the torch assembly transmits acquired images and/or image data to a power supply without analyzing the acquired images and/or image data at 420. For example, the torch assembly may forward acquired images and/or image data to the power supply as the images and/or image data are acquired and/or in batches or sets. Alternatively, at 430, a processor in the torch assembly (e.g., processor 190) may analyze the acquired images and/or image data with optical recognition techniques to identify one or more markings included on the one or more interchangeable torch components. For example, if the imaging device is constantly acquiring images and/or image data, the processor may detect changes in the acquired images and/or image data and then apply optical recognition techniques to images and/or image data when a change is detected (e.g., compare the one or more markings to a library of images). Alternatively, if the imaging device is acquiring images and/or image data at predetermined intervals, the processor may analyze each acquired image and/or image data with optical recognition techniques.

If the torch assembly applies optical recognition techniques to acquired images and/or image data at 430, the torch assembly may then determine, at 440, if one or more markings in the acquired images and/or image data are recognized. If the one or more markings are recognized at 440, the marking(s) or data representative of the marking(s) is transmitted to the power supply at 450. However, in some embodiments, prior to the transmitting at 450, the torch assembly may determine if the necessary parts for an operation are in place at 445 (this determination need not always occur and, thus, 445 is shown in dashed lines). For example, if a particular torch assembly requires an electrode, a gas distributor, a torch tip, and a shield cup to function properly for a particular plasma cutting operation, the torch assembly may determine that all of these components are currently installed on the torch assembly before initiating the operation.

If the torch assembly (or more specifically, the torch assembly's processor) determines that a necessary component is not installed (or is not properly installed), the torch assembly determines that parts are not in place at 445 and prevents the power supply from operating at 460 (i.e., by sending a signal to the power supply that prevents the power supply from supplying power). For example, if a shield cap is installed onto a torch before a torch tip is in place, the processor may determine that parts are not in place at 445 and prevent plasma cutting operations at 460. This determination may be made by counting a number of markings identified by the one or more imaging devices and comparing the number to a predetermined number (e.g., four markings may be required to determine that parts are in place), by identifying markings from each of any number of pre-determined required categories (e.g., parts are in place when markings from an electrode category, a gas distributor category, a torch tip category, and a shield cup category are identified). Additionally or alternatively, the parts in place determination may depend on whether markings are seen out of a particular focus range. For example, if markings are not in focus in an acquired image, the associated part might be determined to not be properly installed and, thus, the associated part may be considered to not be in place.

If the torch does not perform a parts in place analysis at 445, the marking(s) or data representative of the marking(s) is transmitted to the power supply at 450. As an example, if the markings "ESAB 60 A GOUGE" are identified by an imaging device, the processor may, in some embodiments, transmit these markings to the power supply. Alternatively, the processor may determine operational settings based on the identified one or more markings and transmit instructions related to the operational settings to the power supply. For example, upon recognizing the markings "ESAB 60 A GOUGE," the processor may instruct the power supply to supply power at 60 Amps and supply plasma gas at a pressure suitable for gouging, and set any other operational parameters necessary for gouging at 60 Amps. Transmitted instructions may be considered "data representative of the detected indicia." However, this is not the only data that is representative of the detected indicia. Other examples include digital data representative of the indicia (e.g., "valid" and "60 A gouging") and analog data representative of the indicia (e.g., values assigned to valid and 60 A gouging). As a more specific example, upon determining that indicia in acquired images and/or image data matches indicia stored in a library (e.g., image IDs 364), the torch assembly may transmit the image and/or image data and a "valid" determination to the power supply, which may handle the remainder of the operations associated with automatically configuring the torch assembly for the valid, identified components.

Regardless of what exactly is transmitted at 450, if the indicia are identified, the torch assembly may, at least eventually, proceed with the torch operation. If, on the other hand, at 440, the torch assembly's processor does not recognize the indicia at 410, the processor may prevent the torch assembly from operating at 460. That is, the torch assembly may be prevented from initiating a cutting- or welding-related process.

Still referring to FIG. 4, although the embodiments discussed herein have, for the most part, discussed torch assemblies with internal imaging devices, in some embodiments, the imaging device may actually be included in the power supply and the cabling between the torch assembly and power supply might include optical components to optically link the power supply with the operative end of the torch body. In these embodiments, the power supply may perform the operations depicted in FIG. 4. Alternatively, the torch assembly may gather information from the power supply (or another external imaging device, such as an imaging device disposed on a lead of the torch assembly that extends between the torch and the power supply) that is acquiring images and/or image data of the operative end of the torch (and any components installed therein).

Figure 5:
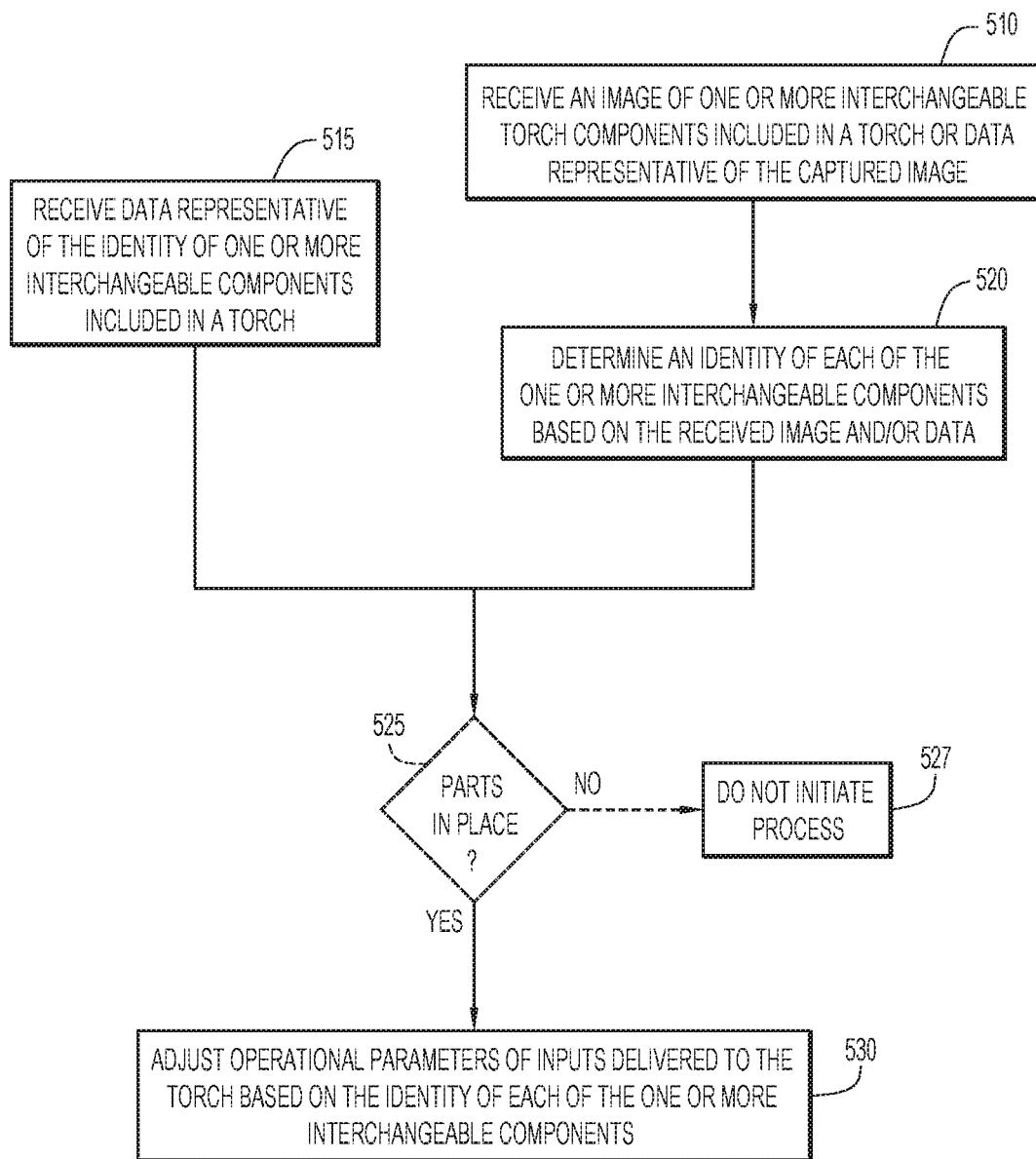
FIG. 5 is a high-level flow chart depicting operations of the power supply of FIG. 3, according to an example embodiment of the present disclosure.

FIG. 5 depicts a high-level flow chart of the operations of the power supply configured in accordance with an example embodiment. Initially, at 510 or 515, the power supply receives data from the torch assembly. More specifically, at 510, the power supply receives one or more images and/or image data of one or more interchangeable torch components included in a torch or data representative of the acquired images and/or image data. As mentioned above, data representative of the acquired images and/or image data may include digital data representative of the indicia (e.g., "valid" and "60 A gouging"), analog data representative of the indicia, and instructions for adjusting the operational parameters. If the data is or includes instructions, the power supply may simply adjust the operational parameters provided to the torch assembly at 530 (and, thus, 520 is shown in dashed lines).

However, if the data neither includes instructions nor identifies the interchangeable torch components (this data is received at 515), the power supply must determine the identity of the one or more interchangeable torch components with indicia in the acquired images and/or image data. For example, if the power supply receives the images and/or image data, the processor in the power supply may apply optical recognition techniques to the images and/or image data. As another example, if the power supply receives analog or digital data representative of indicia identified in an acquired images and/or image data, the power supply may query a lookup table with this data to identify one or more interchangeable torch components associated with the indicia represented by the received data. Notably, in embodiments that identify combinations of interchangeable torch components at the power supply, one or more imaging devices may send data to the power supply so that, at 510 (or 515), the power supply may be receiving data from multiple sources.

If at 515 or 520 the power supply does not receive an identity or is unable to determine an identity, respectively, the power supply may determine that an interchangeable torch component is incompatible with the particular torch assembly, be it a plasma cutting torch assembly, a welding torch assembly, or any other torch assembly (the plasma components mentioned herein are merely examples, and the techniques presented herein may identify any components for any torch assembly type). For example, if data received at 510 indicates that the component does not include indicia, the power supply may determine that the interchangeable torch component is incompatible with the torch assembly and activate a status indicator on the torch to inform the user of the torch 20 that an incompatible component is attached to the torch.

In some embodiments, the power supply may also determine whether parts are in place at 525 (however, in some embodiments, the power supply does not determine if parts in place and, thus, 525 is shown in dashed lines). The power supply makes this determination in accordance with the description of step 445 included above which, for brevity, is not repeated here. That is, in some embodiments, the power supply determines whether parts are in place and, thus, the description of 445 included above may be applicable to step 525. In some of these embodiments, the power supply determines if parts are in place in lieu of the torch assembly making this determination. Alternatively, the power supply and torch assembly may work together to determine if parts are in place. That is, the power supply and torch assembly may complete operations described above in connection with 445 in tandem or unison. In still other embodiments, the torch assembly may render a parts in place determination independently (and, the power supply can ignore this step). If the power supply analyzes indicia to determine whether parts are in place, the power supply may refrain from initiating a welding or cutting process, at 527, when parts are not in place. When parts are in place, the power supply may proceed to step 530 and any of one or more, or all of active status indicators on the torch may be deactivated.

At 530, the power supply adjusts the operational parameters of the torch assembly based on the identity determined at 520. For example, if an interchangeable torch component is identified as a 60 Amp or 40 Amp cutting tip for a plasma cutting torch assembly, the power supply may adjust the power delivery so that 60 Amps or 40 Amps of current are delivered to the torch assembly, respectively. Moreover, if the power supply detects that a user is attempting to change the current to 100 Amps when the power supply has determined that the 60 Amp or 40 Amp torch tip is installed on the torch body, the power supply may automatically roll the current back to a safe level (i.e., to 60 or 40 Amps). That is, in some instances, the techniques may not prevent arc initiation, but will ensure arc transfer is effectuated with optimal operational parameters (to ensure safety and high quality operations). Alternatively, if the torch tip is identified as a gouging tip, the power supply may be set to a gouging mode. Still further, if the torch tip is unidentified, the power supply may either prevent arc transfer to a work piece or limit the operational settings to very low levels to ensure that the unidentified component does not fail and damage other torch components or endanger the end user. This may prevent counterfeit or unsuitable/undesirable components from being used with or damaging the torch body.

Figure 6:
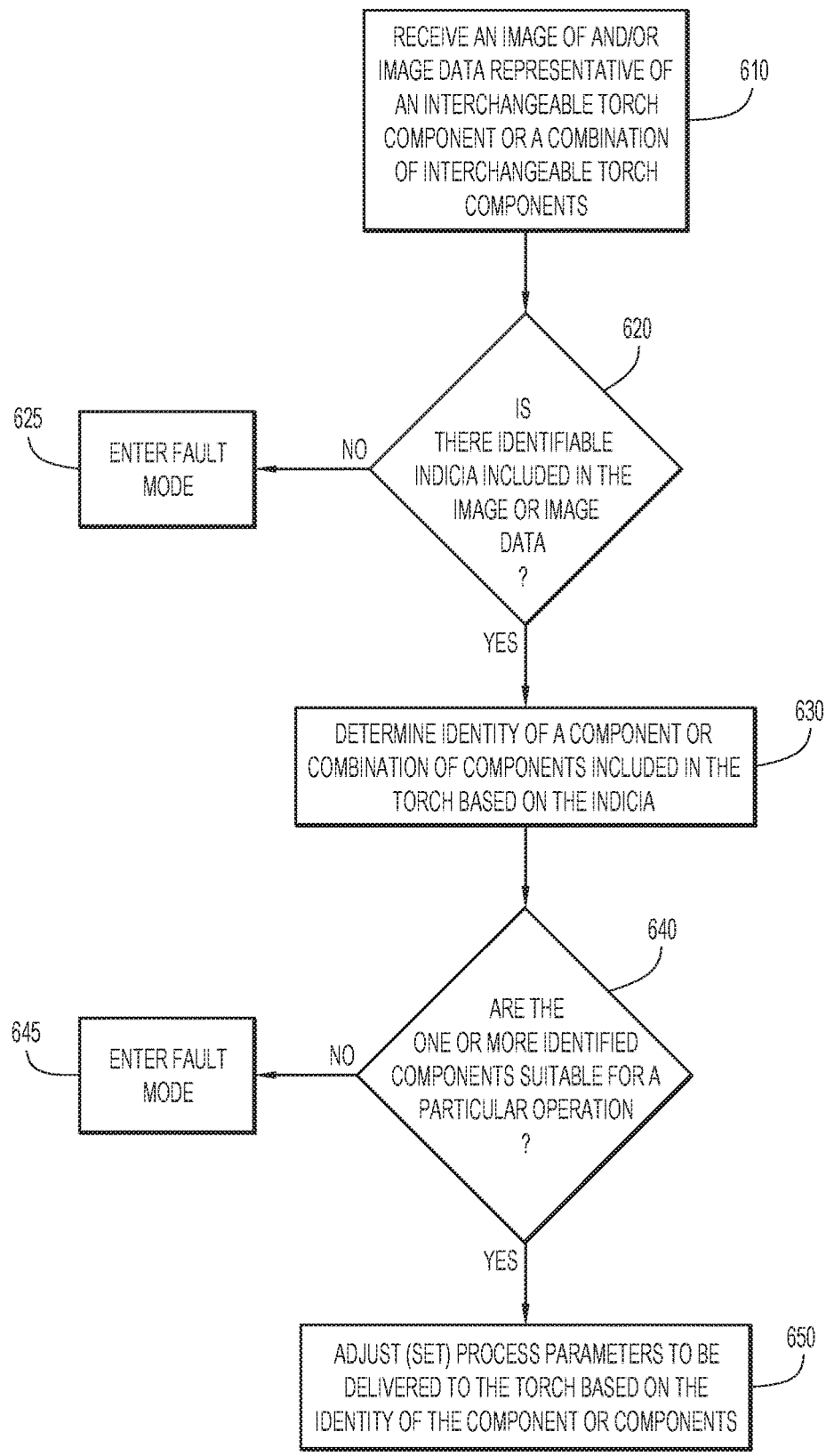
FIG. 6 is a high-level flow chart depicting operations of the power supply of FIG. 3, according to another example embodiment of the present disclosure.

FIG. 6 depicts another high-level flow chart of the operations of the power supply configured in accordance with another example embodiment. In FIG. 6, the power supply initially receives acquired images and/or image data of an interchangeable torch component or a combination of interchangeable torch components from the torch assembly at 610. At 620, the power supply determines if the one or more interchangeable torch components included in the acquired images and/or image data include any identifiable indicia. This determination may determine if the parts are genuine (i.e., suitable for the torch assembly and not counterfeit). In some embodiments, the library of images used to identify indicia may include tags indicating whether indicia are genuine. Alternatively, the library of images may only include genuine indicia so that only genuine indicia are identified.

If identifiable indicia are found at 620 (and, thus, the parts are determined to be genuine at 620), the power supply may then determine identities for any identifiable interchangeable torch components currently installed in or on the torch assembly at 630. At 640, the power supply determines whether the identified interchangeable torch components are consistent or compatible for a particular cutting/welding operation. To make this determination, the power supply may determine if multiple identified interchangeable torch components can or should be used together and/or if one or more identified interchangeable torch components are suitable for selected welding/cutting operations. For example, the power supply may determine if an electrode, a torch tip, a gas distributor, and a shield cup currently installed in/on a torch assembly are all suitable for a 100 Amp air/air cutting operation.

If, instead, at 620 the power supply determines that one or more parts are not genuine and/or unsuitable for the particular torch assembly (i.e., one or more parts are counterfeit), the power supply may enter a fault mode at 625. Similarly, if, at 640, the power supply determines that at least one of the identified interchangeable torch components is incompatible with other identified interchangeable torch components (i.e., one interchangeable torch component is not suitable for 100 Amp air/air cutting) the power supply may enter a fault mode at 645. When the power supply is operating in fault mode, it may prevent operations of the torch assembly. Alternatively, in fault mode, the power supply may limit operations of the torch to operations that will not experience a degradation in quality and/or become unsafe when operating with the identified interchangeable torch components. By comparison, if the power supply determines that the identified interchangeable torch components are compatible with each other and/or suitable for a particular cutting/welding operation, the power supply may automatically adjust, at 650, process parameters (i.e., operational parameters) to be delivered to the torch assembly based on the identity of the component or components. That is, the power supply (or the torch assembly) may determine that identified components are all intended to be used for a particular operation and the power supply may adjust operational parameters of the torch assembly to support the particular operation.

FIGS. 7A-D, 8A-D and 9A-D illustrate diagrams of various example embodiments of the techniques presented herein. In each of the embodiments depicted in FIGS. 7A-D, 8A-D, and 9A-D, a processor included in the torch assembly 301 (e.g., processor 190) operates a camera 160 with a built in illumination source 170 to acquire an image of a marking 210 and performs image processing of the image. However, as has been discussed repeatedly herein, a camera is just one example of an imaging device and in other embodiments, the torch assembly 301 can include one or more imaging devices configured to acquire images or image data. Similarly, an image is only one type of data that may be acquired, as is discussed in detail below. Put another way, the embodiments discussed depicted in FIGS. 7A-D, 8A-D and 9A-D are each described with respect to specific examples, but these examples are not intended to be limiting and each of the embodiments could be modified in view of any of the description included herein.

Figure 7A:
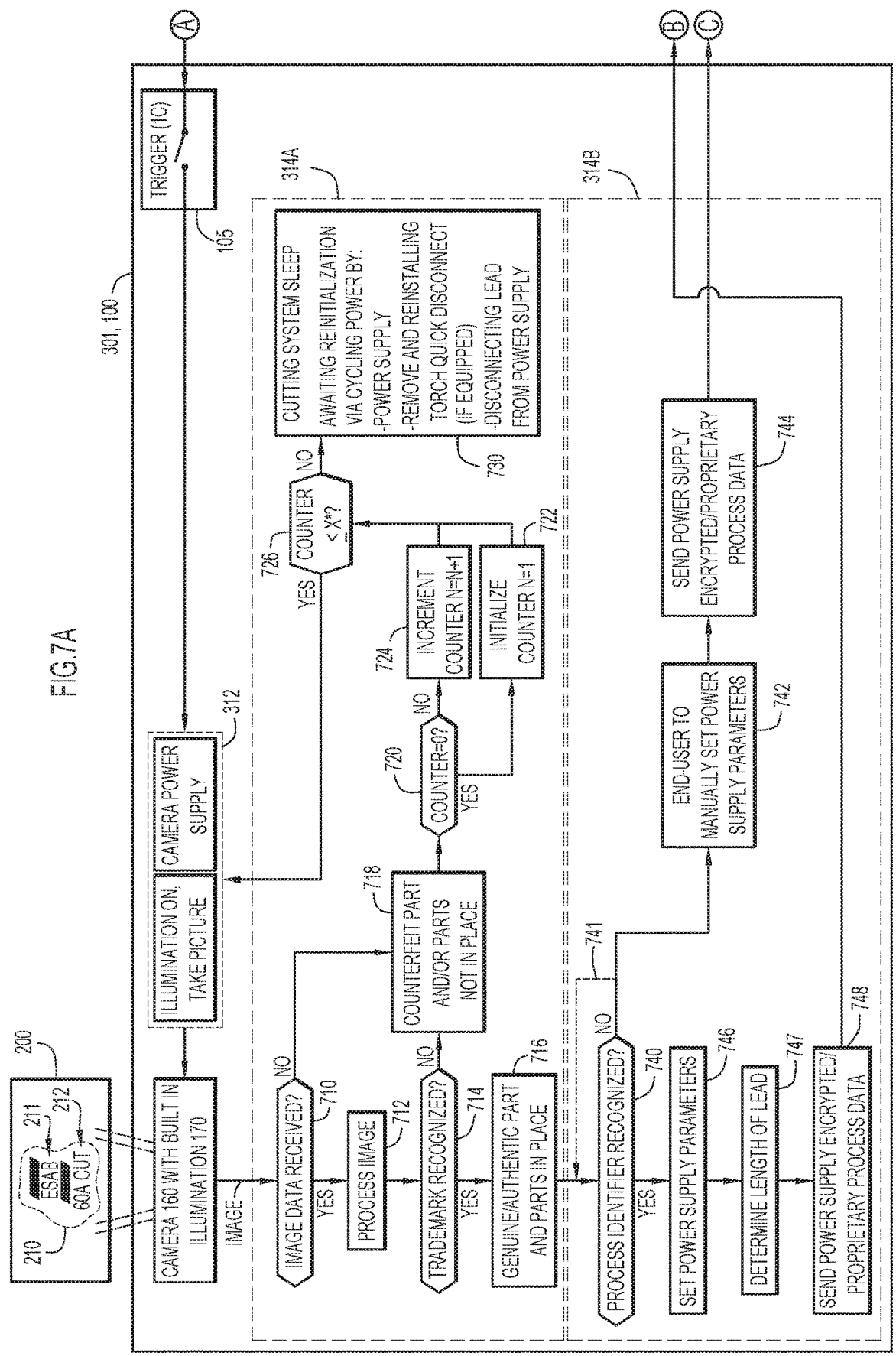

Overall, there are two main differences between the various embodiments depicted in FIGS. 7A through 9D: (1) the manner in which the camera is initiated; and (2) the manner in which signals are sent to the power supply. Each pair of figures (e.g., FIGS. 7A-B and 7C-D, FIGS. 8A-B and 8C-D, and FIGS. 9A-B and 9C-D) depicts a different camera initiation method and, within each pair, the two diagrams depict different signaling options. However, the signaling options are largely constant across the pairs. For example, FIGS. 7A-B and 7C-D depict two different signaling options, but the signaling options from FIGS. 7A-B are also depicted in FIGS. 8A-B and 9A-B. Meanwhile, FIGS. 7A-B and 7C-D depict a first camera initiation method, FIGS. 8A-B and 8C-D depict a second camera initiation method, and FIGS. 9A-B and 9C-D depict a third camera initiation method. Aside from these differences, many of the steps of the embodiments shown in depicted in FIGS. 7A-9D are similar across the embodiments, if not identical. Thus, like portions of these figures are labeled with like reference numbers and, for brevity, like reference numbers are only described once.

With that in mind, the embodiment of FIGS. 7A-B is now described in detail. The process begins at 702, which may be indicative of a power supply 350 being powered on (e.g., when a user flips a power switch or plugs in power supply 350). In FIGS. 7A-B (as well as FIGS. 8A-B and 9A-B) the depicted power supply is a "smart" power supply that is implementing at least a portion of the techniques presented herein (the power supply in FIGS. 8A-B is smart, but differs slightly as compared to the power supplies depicted in FIGS. 7A-B and 9A-B and, thus is labeled at 350"). By comparison, the power supplies depicted in FIGS. 7C-D, 8C-D, and 9C-D are "dumb" power supplies 350' that are not implementing any of the techniques presented herein. That is, the dumb power supplies 350' may be traditional or known power supplies from pre-existing systems. Thus, FIGS. 7A-B, 8A-B, and 9C-D illustrate how the techniques presented herein may be useful when incorporated only into a torch assembly 301 that is used with any desired power supply.

Still referring to FIGS. 7A-B, after 702, a start/power circuit 704 provides power to the torch assembly 301 and, in particular, begins to deliver power to circuitry associated with a trigger 105 of the torch assembly 301. Then, when a user actuates the trigger 105 (thereby closing the trigger circuitry, which is illustrated as a single switch, but may include any desirable circuitry), the power from the power supply 350 is delivered to a camera 160 with a built-in illumination source 170. Imaging logic 312 (e.g., as was introduced in FIG. 3) may control this transfer of power.

When the camera 160 and its built-in illumination source 170 receive power, the camera 160 is able to acquire an image of one or more markings 210 on one or more consumables 200 attached to the torch assembly 301. In the embodiments depicted in FIGS. 7A-B-9C-D, the consumable 200 is a unitary cartridge and the one or more markings 210 include a first marking 211 and a second marking 212. The first marking 211 is a trademarked logo that can be used to determine the unitary cartridge 200 is a genuine/authentic part and the second marking 212 is a process identifier that can be used to determine the process for which that the unitary cartridge 200 is intended. However, these are just examples and, as has been discussed repeatedly herein, in other embodiments, the techniques herein can recognize and identify any desirable interchangeable component based on images or image data of a wide variety of markings (i.e., one or more passive, mechanical markings).

Still referring to FIGS. 7A-B, once the camera 160 acquires an image of the first marking 211 and/or the second marking 212, this image is passed to an image processor included in the torch (e.g., processor 190, as was introduced in FIGS. 1B and 2A-3) and the image processor executes ID logic 314 (a subcomponent of ID logic 314, which was also introduced in FIGS. 1C-3) to identify the consumable based on the image of marking 210. More specifically, initially, the image processor executes genuine part ID logic 314A to determine if the consumable is genuine based on the first marking 211. Then, the image processor executes process ID logic 314B (a subcomponent of ID logic 314) to determine operational parameters associated with the cartridge 200 based on the second marking 212.

When executing genuine part ID logic 314A, the image processor first determines, at 710, whether an image has been received. This determination may provide a check on the camera 160 to ensure that the camera 160 is not malfunctioning (e.g., to determine if the camera is not capturing images). When an image has been received, the image processor processes the image at 712 using optical character recognition techniques (as described above) and attempts to recognize a trademark at 714. If data is not received at 710 or a trademark is not recognized at 714, the genuine part ID logic 314A (or more specifically, the processor executing this logic) determines, at 718, that either an unmarked cartridge 200 (e.g., a counterfeit part) is installed in the torch body 100 or that a cartridge 200 is not properly installed in the torch body 100. If the process moves to step 718, the genuine part ID logic 314A then begins to try to re-image the one or more markings 210. This re-imaging cycles until a counter (counting the imaging attempts) reaches a predefined threshold, as is shown by steps 720, 722, 724, and 726, which illustrate a counter initializing at one at 720/722, incrementing by 1 at 720/724, and checking against the threshold at 726. The pre-defined threshold may be an integer value that is used to limit a number of cycles, a time value, or a combination of these values.

Once the counter reaches the threshold, the camera 160 stops trying to acquire an image of the one or more markings 210 and, instead, the genuine part ID logic 314A causes the camera 160 to stop operations while also causing the cutting system as a whole to sleep at 730. That is, if the first marking 211 is not identified as a predetermined trademark at 714, the torch assembly 301 will not send a start signal to the power supply and, thus, the torch assembly 301 will not receive any cutting or arc initiation power. Put simply, the cutting system will not be able to cut if the first making 211 is not recognized with optical recognition techniques. For example, the system will act as if the trigger 105 was never actuated. However, as is discussed above, in different embodiments, the cutting system may respond in different manners when the first marking 211 is not identified (e.g., by providing the torch assembly with only a minimal level of power). Once the system is asleep at 730, the system can be re-initialized by cycling power to the torch assembly 301 (i.e., turning the torch assembly 301 off and then on). This cycling can be accomplished by restarting the power supply 350, temporarily detaching the torch assembly 301 from the power supply 350 (e.g., by disconnecting the lead from the power supply 350), or temporarily detaching the torch body 100 of the torch assembly 301 from its lead (e.g., via a quick disconnect).

If, instead, the first marking 711 is recognized at 714 (e.g., if the cartridge includes an ESAB logo that includes black bars above and below the lettering), the genuine part ID logic 314A may determine that the cartridge is genuine and may also determine that the cartridge 200 is in place. That is, in the depicted embodiment, the optical imaging of a consumable may not only recognize consumables as genuine, but may also replace typical parts-in-place or safety circuits. In these embodiments, the genuine part ID logic 314A may only consider a trademark as recognized when it is seen in a specific location, such as a specific radial location at an operative end of a torch assembly 301 (e.g., at 12 o'clock).

Once a cartridge 200 is determined to be genuine and in-place by the genuine part ID logic 314A, the process ID logic 314B may attempt to determine the purpose for which the cartridge 200 is intended based on the second marking 212 (the "process identifier"). Additionally, according to some embodiments, one or more of the status indicators 34a-b and/or 35a-b located on the torch 21 is activated to inform the user of whether or not the cartridge 200 is properly assembled on the torch 21 and/or whether the cartridge is genuine. Initially, the process ID logic 314B may determine at 740, if the process identifier 212 has been recognized in the image captured by camera 160. In at least some embodiments, if the first marking 211 is recognized at 716 (thereby causing the torch to begin executing process ID logic 314B) but the second marking 212 is not identified at 740, the process ID logic 314B may try to re-analyze the acquired image at 740 (as indicated by dashed arrow 741). Alternatively, although not shown, the process ID logic 314B could cause the camera to re-image the one or more markings 210 to attempt to identify a second marking 212. The re-analyzing and/or the re-imaging may cycle until a counter (counting the re-imaging and/or re-analyzing attempts) reaches a predefined threshold, just like the cycling/counter illustrated by steps 720, 722, 724, and 726. However, notably, if the re-imaging or re-analyzing times out at 740/741, the system will not sleep. Instead, since the cartridge 200 has already been identified as genuine, the torch assembly 301 will still signal the power supply 350 to fire the torch assembly 301, just without providing any operational settings that are determined based on process identifier 212, as is explained in detail below. According to some embodiments, when the torch 20 is fired, one or more or all of the status indicators on the torch that are in the line of sight of the user are deactivated for the purpose of not distracting the user while the cutting operation is being carried out. The deactivation of the status indicators may occur at or immediately prior to step 774.

If the process identifier 212 is recognized at 740, the image processor executes the process ID logic 314B to determine power supply parameters (e.g., current, gas pressure, and operating mode) for the power supply 350 to deliver to the torch assembly 301 at 746. If the process identifier 212 is not recognized at 740, the process ID logic 314B determines, at 742, that the power supply parameters will need to be set manually at the power supply 350. According to some embodiments, this results in an activation of a status indicator 34a-b/35a-b on the torch to notify the user the cutting system is to be operated in manual mode. Then, the torch assembly 301 sends a signal to the power supply at either 744 or 748. Notably, if the torch assembly 301 signals the power supply 350 at 748, the signal includes power supply parameters, but if the torch assembly 301 signals the power supply 350 at 744, the signal does not include power supply parameters. That is, once the camera 160 acquires an image of the one or more markers 210 and the image is processed by the genuine part ID logic 314A and the process ID logic 314B, the torch assembly 301 either: (a) sends a signal to the power supply 350 at 748 that causes the power supply 350 to automatically set operational settings of the torch assembly 301 (e.g., automatically adjust the cut mode, power, and gas pressure); or (b) sends a start signal to the power supply at 744 that indicates the torch assembly 301 is ready to fire. According to some embodiments, this results in the activation of a status indicator 34a-b/35a-b on the torch 21 to notify the user the cutting system is to be operated in automatic mode. In the latter scenario (i.e., option (b), where the image processor instructs the power supply to use manually input operational parameters), a user will need to manually input operational parameters. Notably, the torch assembly need not send signals at both 744 and 748. Instead, a signal is sent at 744 or at 748.

In the embodiment depicted in FIGS. 7A-B, each signal sent from the torch assembly 301 to the power supply 350 is encrypted at the torch assembly 301. Thus, when the power supply 350 receives a signal from the torch assembly 301, a processor included in the power supply (e.g., processor 354 from FIG. 3) executes image ID logic 364 to decrypt the signal and operate the power supply 350 based on the signal. More specifically, if a signal is sent at 744, the signal is decrypted at 762 and the power supply 350 determines that manually input cutting parameters are required at 764 and the user is alerted by use of a status indicator 34a-b/35a-b on the torch 20 that cutting parameters need to be manually set. Meanwhile, if a signal is sent at 748, the signal is decrypted at 752 and the power supply 350 automatically sets cutting parameters at 754 based on data in the decrypted signal.

Once operational parameters are set at 764 or 754 (manually or automatically, respectively), the power supply 350 displays the parameters at 770 and, executes its operational logic 362 to determine, at 772, that an attached torch is ready to fire and to apply the selected operational parameters at 774 (either automatically or manually). The torch then fires at 780. Just prior to (e.g., within 3 seconds) or at the time the torch is fired (e.g. at the time arc power is delivered to the torch electrode 120 or tip 140), the previously activated status indicators on the torch 20 are deactivated. The indicators may remain deactivated while the cutting operation is being carried out. According to some embodiments, when the cutting operation to terminated (e.g. when no arc power is being delivered to the torch electrode 120 or torch tip 140), the previously activated status indicators may be reactivated.

Notably, due the foregoing power, data, and logic flows, the example embodiment depicted in FIGS. 7A-B images cartridge 200 (or other consumables installed on the torch body 100) every time the trigger 105 is pulled to: (1) determine whether the one or more installed components are genuine; and (2) attempt to determine appropriate operational settings for the one or more installed components. This ensures that genuine components (e.g., a genuine cartridge) are properly installed for each use of the torch assembly 301 and may also ensure proper operational parameters are used for each use of the torch assembly 301. Meanwhile, the camera 160 may be protected from burning out due to the governing of camera actuations with the threshold. As one example, limited cycling may prevent the camera from trying to continuously image an absent consumable cartridge if a trigger were accidentally left depressed between uses of a torch assembly (the torch 100 would not be firing in this scenario since the torch assembly 301 would not recognize a genuine part in place).

Now turning to FIGS. 7C-D, this example embodiment is identical to at least a portion of the embodiment shown in FIGS. 7A-B; however, now, the torch assembly 301 is connected to a dumb power supply 350' and the torch assembly 301 is unconcerned with the second marking 212. Thus, the torch assembly 301 does not include or does not execute process ID logic 314B. Instead, if the genuine part ID logic 314A determines that a consumable 200 is genuine and in-place at 716, the genuine part ID logic 314A toggles two switches in the torch assembly 301 which indicate to power supply 350' that the torch 301 is ready to fire.

In particular, the torch assembly 301 of FIGS. 7C-D closes a parts-in-place (PIP) switch 802 and a start switch 804. Switches 802 and 804 may be real or virtual switches (e.g., mechanical or solid state switches). For example, in some embodiments, a microprocessor executing logic 314A may output a specific voltage at 716 that close switches 802 and 804. Once switches 802 and 804 are closed, the torch's processor sends two signals to the power supply 350': a signal indicating that parts are in place (i.e., a "parts-in-place signal") and a signal (e.g., a high-low signal) indicating the torch assembly 301 is ready to fire. The signal sent through the start switch 802 may be a non-encrypted version of the signal sent to the power supply at 744 of FIGS. 7A-B while the signal sent through switch 802 is sent to a PIP circuit 810 included in power supply 350. Once the power supply 350 processes both of these signals, the power supply 350 determines it is ready to fire at 772. According to some embodiments, when the consumable 200 is determined to be genuine and in-place, one or more status indicators on the torch 20 are activated to alert the user the torch is ready to fire in a manual mode (i.e., to alert the user that the torch is ready to fire, but settings need to be set manually). For example, the same indication provided after 742 in FIGS. 7A-B (e.g., a yellow light) might be provided after 716 in FIGS. 7C-D. Thereafter, when the cutting operation is being carried out, one or more or all of the status indicators on the torch 20 that are in the line of sight of the user are deactivated. Thereafter, when the cutting operation is ceased, one or more or all of the previously deactivated status indicators are re-activated.

Generally, the embodiment illustrated in FIGS. 7C-D would allow a torch assembly 301 implementing the techniques presented herein to operate with a variety of "dumb" power supplies. By comparison, the embodiment illustrated in FIGS. 7A-B may allow a torch assembly 301 implementing the techniques presented herein to only work with a "smart" power supply 350 also implementing the techniques presented herein. In order to ensure that users would not have to acquire a new power supply when acquiring a torch assembly 301 that implements the techniques presented herein, the logic shown in FIGS. 7A-B and 7C-D could be included in one physical torch assembly 301 as two different modes. Thus, the torch assembly 301 could operate with a "smart" power supply 350 or a dumb power supply 350'. In this scenario, the torch assembly 301 might operate in accordance with FIGS. 7C-D unless it receives a signal from a power supply indicating it should operate in accordance with FIGS. 7A-B. Thus, the torch assembly 301 would need to be configured for bi-directional communication.

Figure 7E:
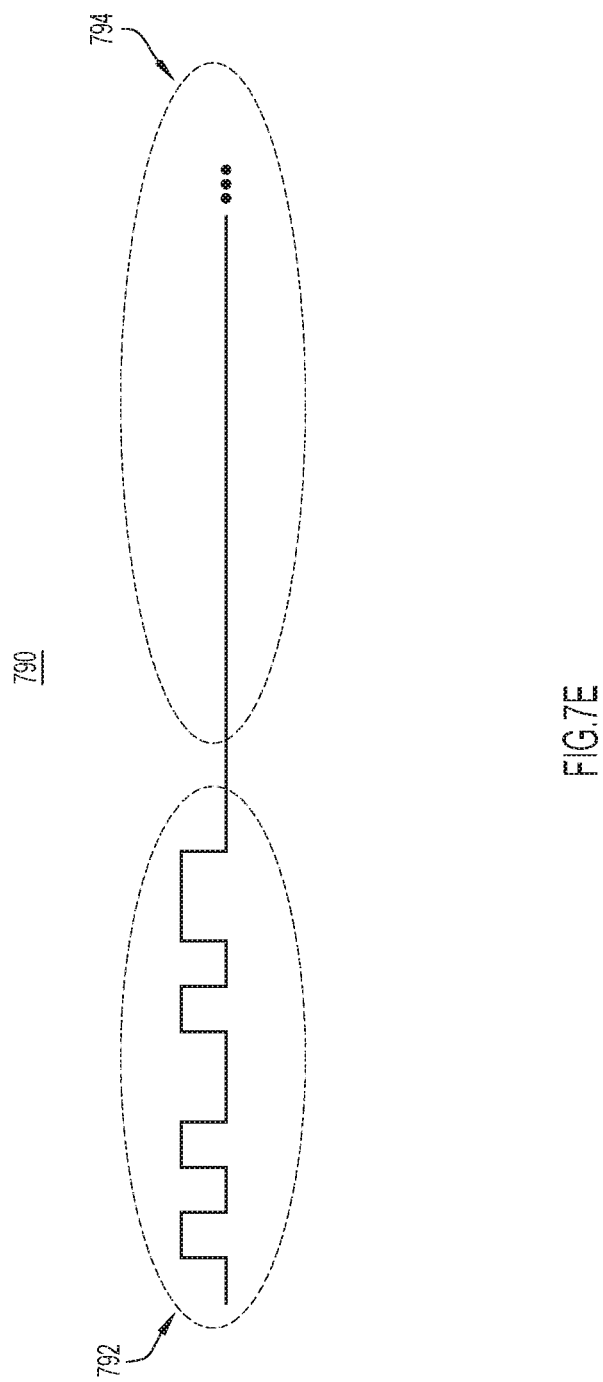
FIG. 7E is a diagram depicting a start signal sent from a torch to a power supply when the torch is implementing the techniques presented herein in accordance with an example embodiment.

As another alternative, the encrypted signal sent by the torch assembly in FIGS. 7A-B could be only partially encrypted, as shown in FIG. 7E, to allow a torch assembly 301 implementing the logic shown in FIGS. 7A-B to be used with both a "dumb" power supply 350' a "smart" power supply 350 (or 350"). As is shown, a partially encrypted signal 790 can include an encrypted portion 792 followed by a non-encrypted portion 794. The encrypted portion 792 would occur first and would persist for a first amount of time. The first amount of time could be predetermined or dynamically determined, but is selected so that a dumb power supply would not see or would not react to the encrypted portion 792. For example, a "dumb" power supply might just see the encrypted portion 792 as noise. The non-encrypted portion 794 includes a standard "On" signal (e.g., a high-low signal) and occurs after the encrypted portion 792.

Due to this structure, a "dumb" power supply would receive a standard "On" signal after seeing noise and operate based on the "on" signal, but a "smart" power supply implementing the techniques presented herein would read and react to the encrypted portion 792 before the non-encrypted portion 794 arrived. The smart power supply would then either ignore the non-encrypted portion 794 or use the "On" signal in the non-encrypted portion 792 to maintain power supply settings (notably, while the "On" signal persists, the torch has maintained power and hasn't had components changed causing a reset condition). In view of the foregoing, the embodiments of FIGS. 7A-B and 7C-D could be combined into one torch assembly that is usable with smart and dumb power supplied alike by using a partially encrypted signal 790 at 744 and 748 of FIGS. 7A-B. That is, utilizing a partially encrypted signal 790 could allow the torch assembly to operate based on a single set of software when connected to smart or dumb power supplies.

FIGS. 8A-B, 8C-D, 9A-B, and 9C-D illustrate modified embodiments of FIGS. 7A-B and 7C-D, respectively. As mentioned above, for brevity, only the differences between the various embodiments are described below and any description of like portions of FIGS. 7A-B, 7C-D, 8A-B, 8C-D, 9A-B, and 9C-D, as well as the description related to combining the two embodiments, is to be understood to apply to the embodiments shown in FIGS. 8A-B, 8C-D, 9A-B, and 9C-D. In FIGS. 8A-B, 8C-D, 9A-B, and 9C-D the most notable change from their counterparts illustrated in FIGS. 7A-B and 7C-D is that the implementations shown in FIGS. 8A-B, 8C-D, 9A-B, and 9C-D do not use optical recognition techniques to determine PIP. Thus, at 716' and 718' logic 314A only determines if a part is genuine and is unconcerned with whether a part is in place (which is considered at 716 and 718 of FIGS. 7A-B and 7C-D).

More specifically, in the implementations depicted in FIGS. 8A-B, 8C-D, 9A-B, and 9C-D, the cartridge 200 and the torch body 100 of the torch assembly 301 both include one or more contacts (e.g., contacts 260 and 265 of FIG. 2B) so that when the cartridge 200 is properly installed on the torch body 100, the contacts engage and form an electrical connection so that cartridge 200 closes a PIP circuit 852. For example, contacts could be included on a shield cup or another insulated component of a unitary cartridge. Thus, in FIGS. 8A-B, 8C-D, 9A-B, and 9C-D, the power supply 350 can only deliver power to the trigger 105 once the PIP circuitry is closed, such as by engagement between torch contacts and consumable contacts.

In FIGS. 8A-B and 8C-D, PIP is determined based on a separate feedback loop and a completed PIP determination is a perquisite to initiating the optical recognition techniques (as executed by logic 314A and 314B). In the implementation of FIGS. 8A-B (e.g., a PIP perquisite implementation with a smart power supply 350″ that is slightly modified as compared to power supply 350), this is accomplished by first delivering power to a parts identification (PID) system power circuit 850. The PID system power circuit 850 can deliver power to the PIP circuit 852 of the torch assembly and can signal the torch start circuit 704 when the PIP circuit 852 has been closed/satisfied. In the modified version of power supply 350″, the PID system power circuit 850 also signals the operational logic 362 of the power supply 350 to indicate that parts in place (as indicated by the arrow from 850 to 772), so that the power supply 350″ needs to wait for only a start signal before being ready to fire. According to some embodiments, when the PIP circuit 852 is closed/satisfied, this also results in one of the status indicators on the torch 20 activating to inform the user of the torch the parts are properly in place, as is explained in detail below.

On the other hand, in the implementation of FIGS. 8C-D (e.g., a PIP perquisite implementation with a dumb power supply), PIP is used as a perquisite by modifying the torch assembly 301 so that the start circuit 704 of the dumb power supply 350′ delivers power to PIP circuit 852 instead of the trigger 105 (even though the power supply 305′ may be delivering power in the same manner as FIGS. 7C-D). Then, once the PIP circuit 852 is closed (e.g., once parts are in place), the PIP circuit 852 in the torch assembly 301 signals the PIP circuit 810 of the power supply 350 while also delivering power to the trigger 105. Once the PIP circuit 810 receives a signal from the torch assembly 301, the PIP circuit signals that parts are in place (as indicated by the arrow from 810 to 772), so that the power supply 350′ needs to wait for only a start signal before being ready to fire. Again, according to some embodiments, when the PIP circuit 852 is closed/satisfied, this also results in one of the status indicators on the torch 20 activating to inform the user of the torch the parts are properly in place, as is explained in detail below.

Thus, in the implementations of FIGS. 8A-B and 8C-D, power is only delivered to trigger 105 when parts are in place. If the trigger is pulled after parts are in place, each implementation proceeds in the same manner as discussed above with regards to FIG. 7A-B or 7C-D (and optionally FIG. 7E as well). Importantly, both power supply 350″ and power supply 350′ will only fire the torch when both a PIP signal and a fire signal are received at 722. Thus, in each of these embodiments, the torch assembly 301 will not fire when parts are in place but the trigger has not initiated execution of logic 314A and/or 314B. Instead, the torch assembly 301 will fire when a start signal sent at 744, 748, or 804 supplements the PIP signal at power supply 350″ or power supply 350. In at least some embodiments, indicators on the torch 20 may assist the user in determining when the torch is ready to fire. For example, one indication may be provided when the PIP circuit 852 is closed and a second indication (e.g., a second light may be activated or a single LED may change colors) may be provided when a consumable part is installed in the torch 20 and the torch is ready to fire in manual mode (e.g., the same indication provided after 742 in FIGS. 7A-B might be provided after 742 in FIGS. 8A-B and after 716 in FIGS. 8C-D). Additionally, in the embodiment of FIGS. 8A-B, a third indication (e.g., a third light may be activated or a single LED may change colors again) may be provided when a consumable part is installed in the torch 20 and the torch is ready to fire in automatic mode (e.g., the same indication provided after 744 in FIGS. 7A-B might be provided after 744 in FIGS. 8A-B).

By comparison, in FIGS. 9A-B and 9C-D, the torch assembly 301 and/or the smart power supply 350 is/are also modified so that PIP circuit 852 receives power before trigger 105. However, now, when the PIP circuit is closed/satisfied, the PIP circuit automatically delivers power to camera 160 and illumination source 170 to begin the optical recognition techniques. Thus, when a cartridge (or other such consumable) is properly installed on a torch supply connected to a power-on power supply (i.e., when parts are in place), the two implementations shown in FIGS. 9A-B and 9C-D automatically complete the optical recognition techniques discussed above in connection with FIGS. 7A-B and 7C-D (as executed by logic 314A and 314B). Then, if genuine parts have been correctly installed on the torch, the torch will fire almost immediately when a user pulls trigger 105.

More specifically, in FIGS. 9A-B, closure of the PIP circuit 852 will signal the PID system power circuit 850 that parts in place and the PID system power circuit 850 will forward this signal to the operational logic 362 of the power supply 350 to indicate that parts in place (as shown by the arrow from 850 to 772). According to some embodiments, this results in one of the status indicators on the torch 20 activating to inform the user of the torch the parts are properly in place. Meanwhile once an image of cartridge 200 has been analyzed by logic 314A and logic 314B, logic 314 will send an encrypted start signal to the smart power supply 350. Once the smart power supply 350 decrypts and processes an encrypted signal from the torch assembly 301, the smart power supply 350 will see a start signal and a PIP signal at 772. However, instead of applying the proper parameters and firing (like in at least FIGS. 7A-B and 8A-B), the smart power supply 350 will now power the trigger 105 so that an actuation of the trigger 105 results in almost immediate firing. If, on the other hand, the power supply is dumb, as is shown in FIGS. 9C-D, the power supply cannot adjust its response to receiving a start signal and PIP signal at 772. Thus, in FIGS. 9C-D, the PIP circuit 852 in the torch assembly 301 signals the PIP circuit 810 of the dumb power supply 350 and, after confirming that cartridge 200 is genuine, logic 314A signals switch 804 to deliver power to trigger 105. Then, like in FIGS. 9A-B, an actuation of the trigger 105 leads almost immediately to firing. In each case of the trigger 105 being actuated, according to some embodiments, a status indicator on the torch is activated to inform the user the torch is ready to fire. That is, a status indicator may inform the user whether appropriate arc power and process gas will be made available to the torch 20 upon a trigger pull. In such instances, according to some embodiments, when arc power is delivered to the torch 20, the previously activated status indicators on the torch are deactivated.

Overall, the implementations illustrated in FIGS. 7A-B, 7C-D, 8A-B, and 8C-D may create a bit of a delay between a trigger pull and the torch firing. However, in at least some embodiments, this delay may be less than one second, such as 200 milliseconds (ms). Moreover, in at least some embodiments, this delay may be desirable since it may replicate familiar torch operations that provide a small delay when checking safety circuits (e.g., circuits that check if parts are in place for a certain time threshold before firing). In fact, in some embodiments, the time delay created by the performance of the optical recognition techniques (as executed by logic 314A and 314B) may be insufficient and an additional delay may be built into the logic that causes the logic to wait to fire until parts have been recognized in place for a certain amount of time (e.g., 200 ms). By comparison, the implementations shown in FIGS. 9A-B and 9C-D may eliminate any delay or lag time.

Moreover, the implementations illustrated in FIGS. 7A-B and 7C-D may perform the techniques presented herein for every trigger pull while the implementations illustrated in FIGS. 8A-B, 8C-D, 9A-B, and 9C-D perform the techniques presented herein every time a part is correctly installed in place (i.e., each time PIP is satisfied). Consequently, the implementations illustrated in FIGS. 8A-B, 8C-D, 9A-B, and 9C-D may also provide an additional manner of waking the system after the system goes to sleep. As is indicated at 730', this additional manner may be disconnecting, or at least partially disconnecting, the cartridge from the torch so that the contacts of the cartridge 200 disconnect from contacts on the torch body. Breaking the connection between the contacts may reset the PIP circuit, which may reset the entire process the implementations illustrated in FIGS. 8A-B, 8C-D, 9A-B, and 9C-D.

FIGS. 8A-B illustrate an additional feature that could be incorporated into any implementation of the techniques presented herein, including the implementations illustrated in FIGS. 7A-B, 7C-D, 8A-B, 8C-D, 9A-B, and 9C-D. This feature is an indicator unit 854 that allows the user to understand when the trigger may be pulled to initiate the optical recognition techniques and/or fire the torch. In the depicted embodiment, the indicator unit 854 includes two status indicators: a PIP unsatisfied indicator 856 and a PIP satisfied indicator 858. In at least some embodiments, the PIP unsatisfied indicator 856 is a red LED and the PIP satisfied indicator 858 is a green LED. However, in other embodiments, indicator unit 854 can provide an indication of: (1) whether a torch is ready to fire in manual mode; and/or (2) whether a torch is ready to fire in automatic mode, either in addition to or as an alternative to the PIP unsatisfied indicator 856 and/or the PIP satisfied indicator 858. Moreover, these indications can be provided by one or more lights (e.g., LEDs 35a-b) included in the torch illuminating in different colors or patterns and/or by text/images displayed on a display screen (e.g., an LED display screen 34a-b) built into the torch. Regardless, due to these indications, a user would know the status of the torch, even if the user were 100 feet away from a smart or dumb power supply connected to their torch.

As an example, if the indicator unit 854 is included on one of the implementations shown in FIG. 7A-B or 7C-D, the indicator unit 854 could provide a first indication (e.g., a yellow light) when logic 314A determines that a genuine cartridge is in place and a second indication (e.g., a green light) when logic 314B determines operating parameters for the genuine cartridge. Thus, if a user sees the first indication on the torch assembly 301, the user will know that parts are in place, but operating parameters need to be set manually at the power supply 350. If, instead, the user sees the second indication on the torch assembly 301, the user will know that parts are in place and operating parameters are being set automatically at the power supply 350 (and, thus, the torch is ready for firing). Notably, the second indication will not be provided if the torch assembly 301 is connected to a dumb power supply, as shown in FIGS. 7C-D since the torch assembly 301 does not include or does not execute logic 314B when connected to a dumb power supply. Finally, if the user does not see any indications the user will know the cutting system is asleep. According to some embodiments, when the torch is fired in either automatic mode or manual mode, the PIP satisfied indicator 858 is deactivated and is thereafter reactivated when the cutting operation is terminated (e.g., in response to a trigger release when a torch is in 2 T mode and in response to a second trigger activation when the torch is in 4 T mode). However, according to some embodiments, when the PIP unsatisfied indicator 856 is activated and the torch is nonetheless fired, the PIP unsatisfied indicator 856 remains activated during the cutting operation.

By comparison, if the indicator unit 854 is included on one of the implementations shown in FIG. 8A-B,8C-D, 9A-B, or 9C-D, the indicator unit 854 might provide a first indication (e.g., a red light) when the cartridge 200 is not in place, a second indication (e.g., a yellow light) when the cartridge 200 is in place, a third indication (e.g., one yellow light and one green light) when logic 314A determines that a genuine cartridge is in place, and a fourth indication (e.g., two green lights) when logic 314B determines operating parameters for the genuine cartridge. This combination of indications can ensure that a user knows when a trigger pull will lead to the torch firing (either immediately or subsequent to executing logic 314A and/or logic 314B). Specifically, a user will know the torch will fire after a short delay in response to a trigger actuation when the implementations of FIGS. 8A-B and 8C-D provide the second indication. Meanwhile, a user will know their torch will fire almost immediately in response to a trigger actuation when the implementations of FIGS. 9A-B and 9C-D provide the third or fourth indication (but that operating parameters need to be set manually when the third indication is provided). According to some embodiments, in the event any of the second, third or fourth indications are provided, arc power can be delivered to the torch 20 to initiate a cutting of the workpiece. According to some embodiments, when the cutting operation is carried out, any of the second, third or fourth status indication lights previously activated are deactivated. Thereafter, when the cutting operation is ceased (e.g. arc power is not being delivered to the torch electrode 120 or tip 140), the second, third or fourth status indication lights previously deactivated may be reactivated.

Now turning to FIG. 10, this Figure provides a high-level flow chart depicting operation of status indicators included on a welding cutting torch, according to an example embodiment of the present disclosure. Initially, at 1010, a torch with one or more status indicators is provided. To be clear, the torch can be any torch that includes status indicators and need not be the torch described in connection with at least FIGS. 1A-2B. The status indicators may be manufactured as part of the torch or retrofitted onto the torch. The one or more indicators may be lights, displays, or any other indicators, as is described in detail above.

At 1020, the status indicators are activated prior to a welding or cutting operation. This activation may provide an indication of welding or cutting-related-information, including operating mode (e.g., gouging, cutting, piercing), operating status (e.g., ready to fire with automatic settings, not ready to fire), cutting parameters (e.g., gas pressure and current), etc. The indications provided by the torch need not relate to optical recognition of consumable components installed on the torch. Moreover, the one or more status indicators may be activated by control circuitry in the torch, in a power supply connected to the torch, control circuitry wirelessly connected to the torch (e.g., via controls signals sent to the torch from a portable electronic device via a wireless connection) or any other manner now known or developed hereafter for activating status indicators.

At 1030, the status indicators are deactivated prior to the delivery of cutting, welding, or arc starting power to the torch so that indicators are not activated (e.g., lights are not illuminated) while cutting or arc starting power is available at the torch. As is explained herein, this deactivation may eliminate distractions while a user is handling a torch. This deactivation may also be controlled by control circuitry in the torch, in a power supply connected to the torch, control circuitry wirelessly connected to the torch (e.g., via controls signals sent to the torch from a portable electronic device via a wireless connection) or any other manner now known or developed hereafter for activating status indicators.

Among other advantages, the techniques described and shown herein allow a user to quickly and seamlessly transition between various cutting and welding operations. The techniques presented herein also provide increased safety and better operating conditions for welding and cutting operations by automatically configuring operational parameters (e.g., power and gas transfer parameters) for the specific components currently installed on/included in a torch assembly. Consequently, inexperienced and experienced users alike need not know (or even try to find) the particular settings for every component and need not even identify components as they install them. That is, the techniques presented herein eliminate the need for the end user to be knowledgeable about ideal settings and/or counterfeit parts. Moreover, even if a user tries to use an unsafe or suboptimal setting, the techniques presented herein may prevent the user from doing so (since the techniques presented herein ensure that ideal settings are applied for specific operations with genuine parts). This will result in improved and more consistent performance, greater ease of use, and improved safety.

As still further examples, the techniques presented herein may inexpensively and reliably identify components. That is, at least as compared to adding electrical components to a torch component, adding a marking to a component may be considerably cheaper and at least as reliable. Moreover, the techniques do not require an additional electrical connection between the power supply and the torch assembly (as compared to typical welding/cutting operations).

To summarize, in one form a torch assembly is presented herein, the torch assembly comprising: a torch body with an operative end configured to removably receive one or more interchangeable torch components including one or more markings, the torch body defining an internal cavity; and one or more imaging devices disposed within the internal cavity and positioned to optically acquire an image of or image data representative of the one or more markings included on the one or more interchangeable torch components so that the one or more interchangeable torch components can be automatically identified based on the one or more markings.

In another form, a system is presented herein, the system comprising: a torch assembly including: a torch body with an operative end that receives an interchangeable torch component with one or more passive, mechanical markings; and an imaging device that is disposed in or within the torch body a torch component that is removably coupleable to the torch body, the torch component including one or more passive, mechanical markings on a surface that is optically viewable by the imaging device when the torch component is removably coupled to the torch body so that the imaging device can optically acquire an image of or image data representative of the one or more passive, mechanical markings; and; and a power supply that automatically adjusts operational parameters based on the one or more passive, mechanical markings.

In yet another form, a method of identifying interchangeable torch components is presented herein, the method comprising: optically acquiring an image of or image data representative of one or more passive markings included on one or more interchangeable torch components installed on or in a torch body by operating one or more imaging devices disposed in or on the torch body; and identifying the one or more interchangeable torch components based on the one or more passive markings.

In still yet another form, a consumable component that is removably coupleable to a torch configured to automatically adjust operational parameters based on an identity of consumable components installed therein is presented herein, the consumable component comprising: a surface that is optically viewable at an operative end of the torch; and one or more passive, mechanical markings disposed on the surface, the one or more passive, mechanical markings providing information relating to at least one of: an identity of the consumable component; an operational parameter associated with the consumable component; and a presence of the consumable component in a requisite location within the torch.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A welding or plasma cutting system comprising:
a torch having a torch body;
one or more status indicators located on or in the torch body; and
control circuitry coupled to the one or more status indicators, the control circuitry being configured to:
activate the one or more status indicators prior to a carrying out of a welding or plasma cutting operation through a use of the torch when a recognized interchangeable torch component is installed on the torch or when an unrecognized interchangeable torch component is installed on the torch; and
subsequent to an activation, deactivate the one or more status indicators during a time when the welding or plasma cutting operation is being carried out by the use of the torch.

2. The welding or plasma cutting system according to claim 1, wherein the control circuitry includes a switch that is transitional between an open position and a closed position, the welding or plasma cutting operation being carried out when the switch is in the closed position.

3. The welding or plasma cutting system according to claim 2, further comprising a trigger operable by a user of the torch, the trigger being moveable between a first position and a second position, the trigger being operatively coupled to the switch in a manner that causes the switch to assume the open position when the trigger is in the first position and to assume the closed position when the trigger is in the second position.

4. The welding or plasma cutting system according to claim 3, wherein the trigger is continuously urged towards the first position.

5. The welding or plasma cutting system according to claim 2, wherein the switch is located inside the torch body.

6. The welding or plasma cutting system according to claim 1, wherein the control circuitry is configured to reactivate the one or more status indicators upon the welding or plasma cutting operation being terminated.

7. The welding or plasma cutting system according to claim 1, wherein the one or more status indicators is selected from the group consisting essentially of an illuminator or display indicative of whether the welding or plasma cutting system is operating in an automatic mode or a manual mode, an illuminator or display indicative of whether or not an interchangeable torch component is properly installed on the torch, an illuminator or display indicative of whether or not one or more interchangeable torch components fixed to the torch are genuine, an illuminator or display indicative of a process parameter of a utility being delivered to the torch, and combinations thereof.

8. The welding or plasma cutting system according to claim 1, wherein the torch body is operative and configured to removably receive one or more interchangeable torch components including one or more markings, the control circuitry including:
 one or more imaging devices positioned to optically acquire an image of or image data representative of the one or more markings included on the one or more interchangeable torch components;
 a memory; and
 an image processor that executes instructions stored in the memory so that the image processor activates at least one of the one or more status indicators based on the acquired image of or image data.

9. The welding or plasma cutting system according to claim 1, wherein the control circuitry is configured to cause the one or more status indicators to deactivate prior to active welding power or arc starting power being supplied to the torch and to maintain the one or more status indicators deactivated while the welding or plasma cutting operation is being carried out.

10. A method of operating a torch of a welding or plasma cutting system, the torch including one or more status indicators, the method comprising:
 activating the one or more status indicators prior to a carrying out of a welding or plasma cutting operation by a use of the torch when a recognized interchangeable torch component is installed on the torch or when an unrecognized interchangeable torch component is installed on the torch; and
 subsequent to an activation, deactivating the one or more status indicators during a time when the welding or plasma cutting operation is being carried out by the use of the torch.

11. The method according to claim 10, wherein the one or more status indicators are activated prior to a delivery of active welding power or arc starting power to the torch.

12. The method according to claim 10, wherein the welding or plasma cutting system is caused to operate in a manual operating mode when the one or more status indicators is activated.

13. The method according to claim 10, wherein the welding or plasma cutting system is caused to operate in an automatic operating mode when the one or more status indicators is activated.

14. The method according to claim 10, wherein the torch includes a switch transitional between an open position and a closed position, the welding or plasma cutting operation being carried out when the switch is in the closed position.

15. The method according to claim 14, wherein the torch includes a trigger operable by a user of the torch, the trigger being moveable between a first position and a second position, the trigger being operatively coupled to the switch in a manner that causes the switch to assume the open position after the trigger enters the first position.

16. The method according to claim 10, further comprising re-activating the one or more status indicators upon the welding or plasma cutting operation being terminated.

17. A welding or plasma cutting system comprising:
 a torch having a torch body;
 one or more status indicators located on or in the torch body; and
 control circuitry coupled to the one or more status indicators, the control circuitry being configured to activate the one or more status indicators prior to a carrying out of a welding or plasma cutting operation through a use of the torch and to deactivate the one or more status indicators during a time when the welding or plasma cutting operation is being carried out by the use of the torch,
 wherein the one or more status indicators are selected from the group consisting essentially of an illuminator or display indicative of whether the welding or plasma cutting system is operating in an automatic mode or a manual mode, an illuminator or display indicative of whether or not an interchangeable torch component is properly installed on the torch, an illuminator or display indicative of whether or not one or more interchangeable torch components fixed to the torch are genuine, an illuminator or display indicative of a process parameter of a utility being delivered to the torch, and combinations thereof.

18. The welding or plasma cutting system according to claim 17, wherein the control circuitry is configured to:
 cause the one or more status indicators to activate when a fully recognized interchangeable torch component or a partially unrecognized interchangeable torch component is installed on the torch; and
 depending on a level of component recognition, cause the welding or plasma cutting system to operate in a manual operating mode or an automatic operating mode during the time when the welding or plasma cutting operation is being carried out by the use of the torch.

19. The welding or plasma cutting system according to claim 17, wherein the torch comprises:
 a switch transitional between an open position and a closed position, the welding or plasma cutting operation being carried out when the switch is in the closed position; and
 a trigger operable by a user of the torch, the trigger being moveable between a first position and a second position, and the trigger being operatively coupled to the switch in a manner that causes the switch to assume the open position after the trigger enters the first position.

20. The welding or plasma cutting system according to claim 17, wherein the control circuitry is further configured to re-activate the one or more status indicators upon the welding or plasma cutting operation being terminated.

* * * * *